(12) United States Patent
Brice et al.

(10) Patent No.: US 6,505,099 B1
(45) Date of Patent: Jan. 7, 2003

(54) RADIANT ENERGY CONTROL SYSTEM

(75) Inventors: Martin S. Brice, Buffalo, NY (US); Gordon M. Kay, Darwen (GB); Peter W. Cook, Burnley (GB)

(73) Assignee: Roberts-Gordon, L.L.C., Buffalo, NY (US)

(*) Notice: Subject to any disclaimer, the term of this patent is extended or adjusted under 35 U.S.C. 154(b) by 0 days.

(21) Appl. No.: 09/172,783

(22) Filed: Oct. 14, 1998

(51) Int. Cl.[7] .................. G01M 1/38; G05B 13/00; G05B 15/00; G05B 21/00; G05D 23/00

(52) U.S. Cl. .................. 700/277; 700/205; 700/207; 700/209; 700/210; 700/276; 700/278; 165/203; 165/209; 165/238; 165/247; 219/483; 219/486; 219/490; 236/1 A; 236/1 B; 236/1 E; 236/49.3

(58) Field of Search .................. 700/19, 32, 205–210, 700/275, 276, 277, 278; 454/61, 62, 311, 312, 319, 333, 335; 165/203, 209, 237, 238, 247, 248; 427/237, 238, 239, 250; 219/490, 483, 486; 236/49.3, 1 A, 1 B, 1 E; 126/574, 578, 630

(56) References Cited

U.S. PATENT DOCUMENTS

| | | | | |
|---|---|---|---|---|
| 3,789,853 A | * | 2/1974 | Reinhard | 128/399 |
| 4,583,597 A | * | 4/1986 | Spector et al. | 169/61 |
| 4,780,989 A | * | 11/1988 | Mears et al. | 47/65 |
| 4,931,948 A | * | 6/1990 | Parker et al. | 700/276 |
| 4,967,382 A | * | 10/1990 | Hall | 700/276 |
| 5,211,331 A |   | 5/1993 | Seel | 236/15 |
| 5,353,986 A | * | 10/1994 | Wortman et al. | 126/92 AC |
| 5,501,265 A | * | 3/1996 | Bujak, Jr. | 165/22 |
| 5,518,176 A | * | 5/1996 | Turner et al. | 236/49.3 |
| 5,601,786 A | * | 2/1997 | Monagan | 422/108 |
| 5,725,148 A | * | 3/1998 | Hartman | 165/217 |
| 5,862,982 A | * | 1/1999 | Federspiel | 236/49.3 |
| 5,924,486 A | * | 7/1999 | Ehlers et al. | 165/238 |
| 5,980,962 A | * | 11/1999 | Bracken et al. | 426/241 |
| 5,994,675 A | * | 11/1999 | Bethune et al. | 219/483 |
| 6,031,211 A | * | 2/2000 | Mailho et al. | 219/121.4 |
| 6,039,774 A | * | 3/2000 | McMullen et al. | 48/102 A |
| 6,107,609 A | * | 8/2000 | Strodtbeck et al. | 219/446.1 |
| 6,167,388 A | * | 12/2000 | Ray | 700/90 |
| 6,182,453 B1 | * | 2/2001 | Forsberg | 62/125 |

OTHER PUBLICATIONS

Brochure, "Heatmiser Range, For Total Energy Control." by G&M Kay.
Brochure, "Heatmiser User Instructions & Engineers Guide." by G&M Kay.
Brochure, "Heatmiser Plus User Instructions & Engineers Guide." by G&M Kay.
Brochure, "Heatmiser Solo User Instructions & Engineers Guide." by G&M Kay.

* cited by examiner

Primary Examiner—Ramesh Patel
(74) Attorney, Agent, or Firm—Simpson & Simpson, PLLC

(57) ABSTRACT

In a radiant energy heating system having one or more types of radiant energy heating sub-systems, a control system comprising a solid state electronic control panel pre-programmed to control two or more of the types of radiant heating sub-systems, wherein the control panel controls one or more of the types of sub-systems.

43 Claims, 46 Drawing Sheets

(Prior Art - Type 1)

(Prior Art - Type 2)

(Prior Art - Type 3)

(PRIOR ART - TYPE 4)

(PRIOR ART - TYPE 5)

Inputs are labeled - When fault inputs are activated at the control they will flash

RADIANT ENERGY CONTROL SYSTEM

This patent includes a microfiche appendix containing three microfiche having 175 frames. The microfiche is intended to be a part of the written description pursuant to 35 U.S.C. §112. This patent also includes a source code listing located in the attached Source Code Appendix which is not intended to be printed comprising 88 printout pages.

FIELD OF THE INVENTION

This invention relates generally to radiant energy heating systems and, more particularly, to a method and apparatus for controlling a radiant energy heating system.

BACKGROUND OF THE INVENTION

Radiant heat is the most effective way of providing comfortable environmental conditions in large open spaces. Radiant energy operates like light, traveling in straight lines and can be directed to specific individuals and areas, which require heating. Comfort levels are created when the radiant energy is absorbed by the floor, plant and machinery, and lower walls without losing energy to the air space between.

The objects that have absorbed the radiant energy in turn release heat to the air and act as low power radiators. In this way, all usable energy is absorbed and utilized in the occupied zone (the lower two meters) and not in the entire structure and roof space. Comfort conditions are achieved using lower air temperatures and, as a result, lower heat losses with a subsequently lower fuel bill.

Roberts-Gordon, a company in Buffalo, N.Y., was a pioneer in the low-intensity infrared heating industry with the introduction of its Co-Ray-Vac® heating system in 1963. Co-Ray-Vac uses less fuel than other heating systems because it heats a building and the people inside in the same manner as the sun heats the earth. The sun does not heat the earth's atmosphere directly; rather, its infrared rays strike the earth, people and objects. These, in turn, act as heat reservoirs and release heat into the atmosphere by convection to raise the ambient temperature. A good example of this is how a concrete sidewalk will continue to release heat even after the sun has set. Similarly, a Co-Ray-Vac system spreads a gentle blanket of low intensity infrared energy that warms the people, floor and objects in a building directly. These also act as heat reservoirs and raise the room temperature through convection. Consequently, Co-Ray Vac offers many benefits that result in improved comfort conditions and greater fuel cost savings. Since the air is heated indirectly, there is less stratification (warm air rising to the ceiling) and less fuel needed to maintain warmth at floor level.

A Co-Ray Vac system comprises a plurality of burners arranged to fire one after the other in series down the same length of tube. In a preferred embodiment, typical tubing comprises 4" O.D., 16 gauge tubing. The heat created by the burners is drawn through the tubes, which radiate the warm, gentle, infrared energy. The tubing may be made of cold rolled steel, aluminized steel and single or double porcelain-coated. A vacuum pump is used to draw the heat throughout the entire system. In addition, it completely exhausts all products of combustion to the outdoors at temperatures typically below 50° F. Arranged about the tubing are specially designed deep-dish aluminum reflectors, which are angled to maximize reflection of the energy emitted by the radiant tube. This ensures that virtually all of the radiant heat is beamed toward the floor, where it is needed.

Although a multiple-burner Co-Ray-Vac system may be suitable for some applications or to heat certain zones within a facility, it may be appropriate to heat other zones using a different type of radiant energy system. For example, Roberts-Gordon also manufactures unitary systems (sold under the trademarks Vantage® II, Vantage®HE, GordonRay®BH, Caribe®, Blackheat® U-Tube, Blackheat® Linear, Blackheat® Double Linear, for example) which have a single burner, which are suitable for heating smaller or hard-to-reach areas. Another alternative is a dual-firing rate system, such as Roberts-Gordon's GordonRay®DF and Blackheat® Hi-Lo system.

Regardless of the type or number of systems employed in heating a facility, it is desirable to control the system, and sub-systems, preferably from a remote location. To accomplish this control, it is necessary to measure certain parameters, such as ambient temperature, pressure within the radiating tubes, etc., and then process these inputs to control the various systems to achieve an optimum balance between air temperature in a zone and mean radiant temperature to maintain a comfortable environment. The problem is compounded when several zones in a facility are heated by different radiant energy heating systems. Although solid state electronic control panels now exist for controlling individual subsystems, heretofore a single panel could not control different types of subsystems, and no PC-based system existed for controlling a plurality of panels.

What is needed, then, is a system designed for the most efficient control of multiburner, unitary burner and dual firing rate burner sub-systems in a general system of radiant energy heating.

SUMMARY OF THE INVENTION

The present invention provides a control system comprising a solid state electronic control panel pre-programmed to control two or more different types of radiant heating sub-systems, wherein the control panel controls one or more of the types of the sub-systems. The invention includes both a method of controlling one or more of the radiant heating sub-systems and an apparatus for implementing the method.

A general object of the present invention is to provide a method and apparatus for controlling one or more types of radiant heating sub-systems.

Another object of the present invention is to provide a system for controlling one or more types of radiant heating sub-systems which includes a programmable electronic control panel and a computer program for controlling one of more control panels from a central personal computer.

These and other objects, features and advantages of the present invention will become apparent to those having ordinary skill in the art upon a reading of the following detailed description in view of the attached drawings, microfiche appendix and appended claims.

DETAILED DESCRIPTION OF A PREFERRED EMBODIMENT

Figure 1:
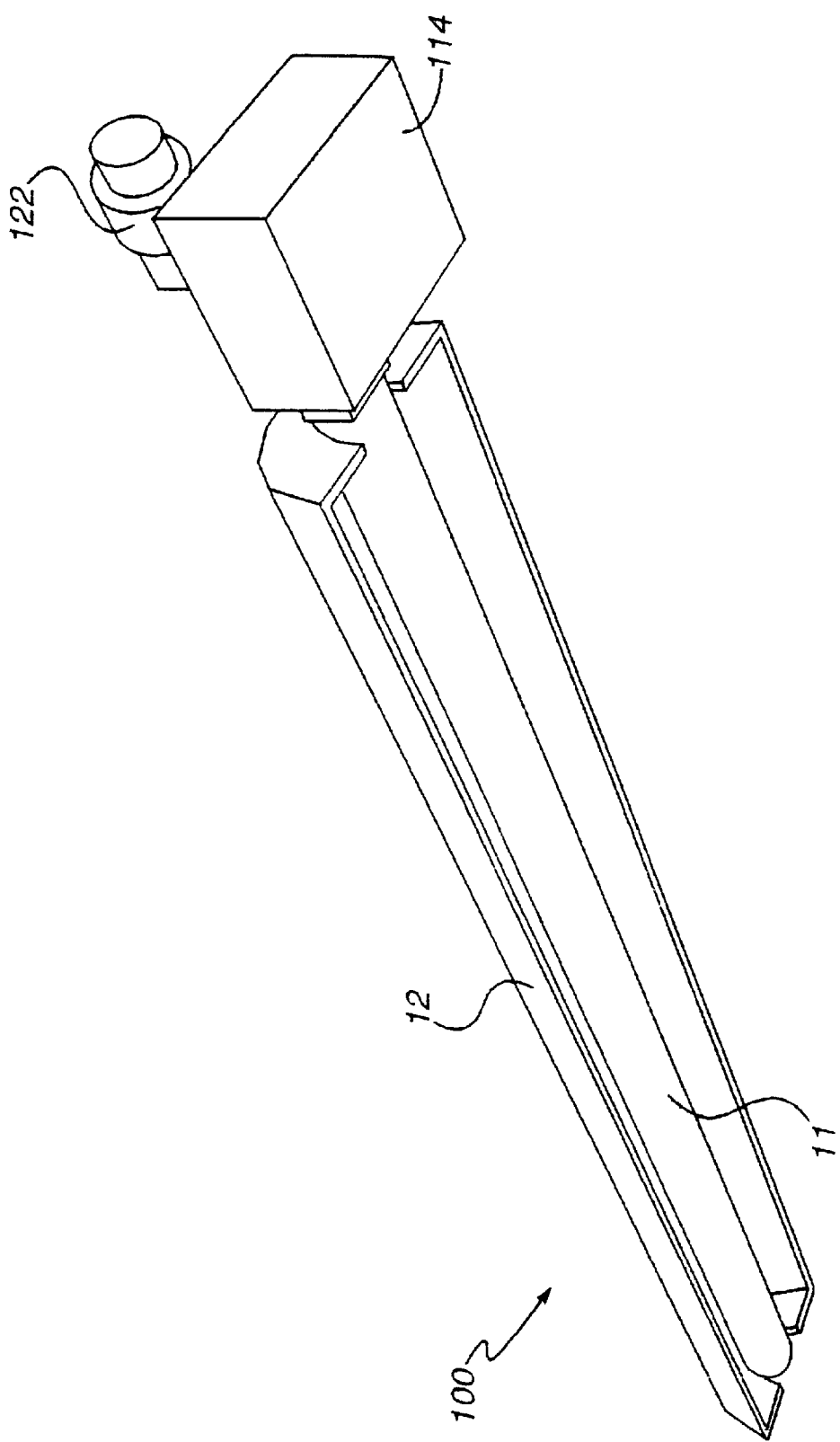
FIG. 1 is a perspective view of a prior art GordonRay®BH brand radiant energy heating unitary subsystem (referred to herein as "Type 1"), manufactured by Roberts-Gordon of Buffalo, N.Y.

The present invention provides a control system for a radiant energy heating system having one or more types of radiant energy heating sub-systems. In the preferred embodiment described herein, all of the sub-systems are gas-fired, low intensity infrared radiant heating. A first type of sub-system, known as a unitary sub-system because it contains a single burner, is sold commercially under the trademarks Vantage® II, Vantage®HE, GordonRay®BH, Caribe®, Blackheat® U-Tube, Blackheat® Linear, Blackheat® Double Linear. The GordonRay®BH sub-system 100 is illustrated in FIG. 1. Unitary sub-system 100 comprises a single gas burner 114 operatively arranged to ignite gas within a first radiant tube 11, and a first reflector 12 operatively arranged to reflect energy emitted by the first radiant tube. This sub-system also includes blower 122 for forcing heat through the system.

Figure 2:
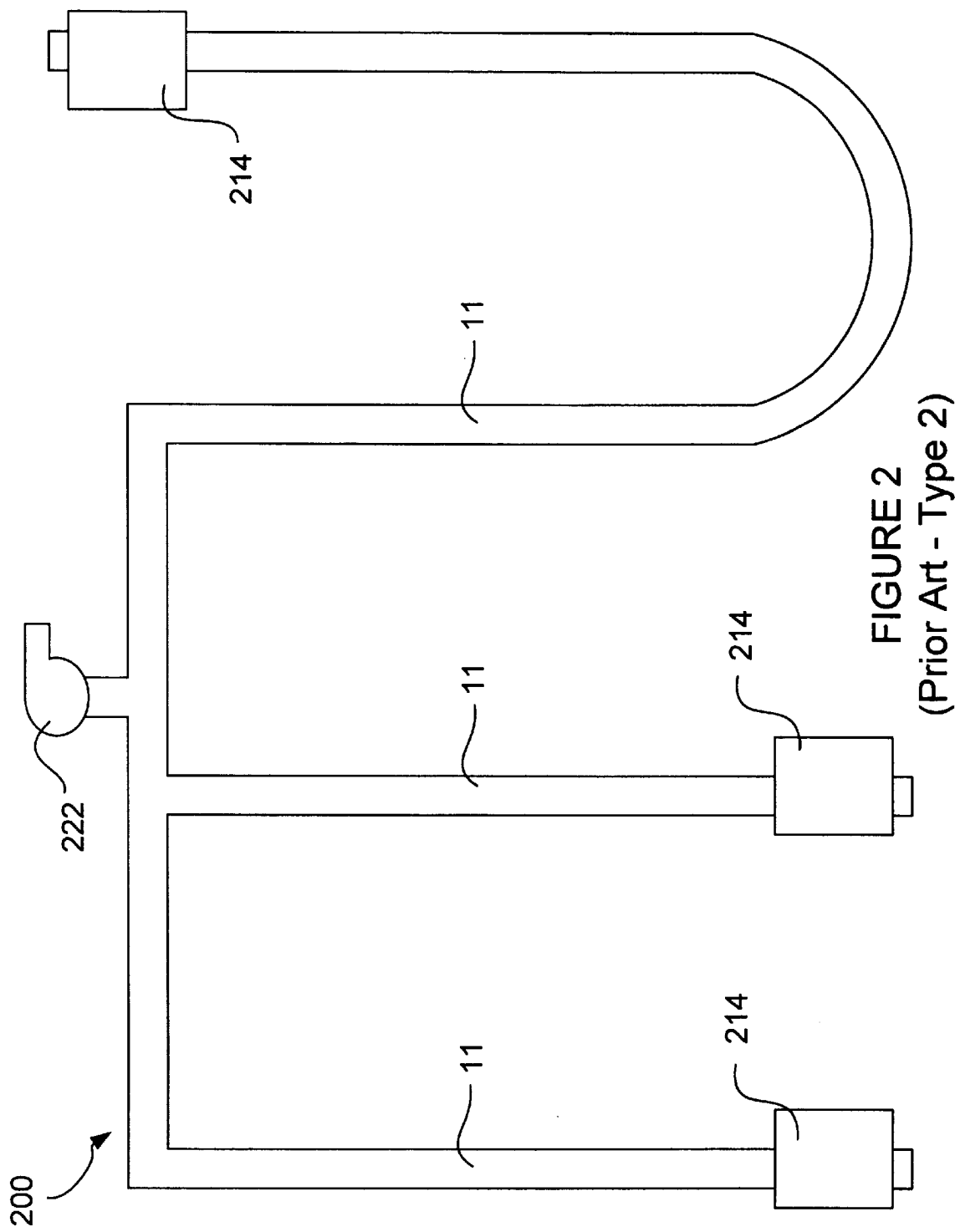
FIG. 2 is a schematic view of a prior art Vantage®EV radiant energy multiburner sub-system (referred to herein as "Type 2)", manufactured by Roberts-Gordon of Buffalo, N.Y.

A second type of sub-system is actually a network of two or more unitary burner systems connected to a common exhaust fan (thereby forming a multiburner system). This second type of sub-system 200, illustrated in FIG. 2, comprises a multiburner system comprising three individual burners 214, each of which ignites gas in its own radiant energy tube 11. This sub-system also contains a common vacuum pump 222 operatively arranged to draw heat through the plurality of tubes 11 and to exhaust products of combustion. (Note that FIG. 2 does not show reflector 12 as shown in FIG. 1, although the reflector would be present in an actual installation.) In operation, it should be appreciated that one or more of the burners and associated tubes may be located in a separate heating zone within a building. For example, as shown in FIG. 2, two of the burners and their associated heating tubes may be located in a first heating zone, while the third burner and its associated tube may be located in a second zone. The vacuum pump is thus configured to operate both zones independently or to operate both zones together, depending upon the demand for heat within the building.

Figure 3:
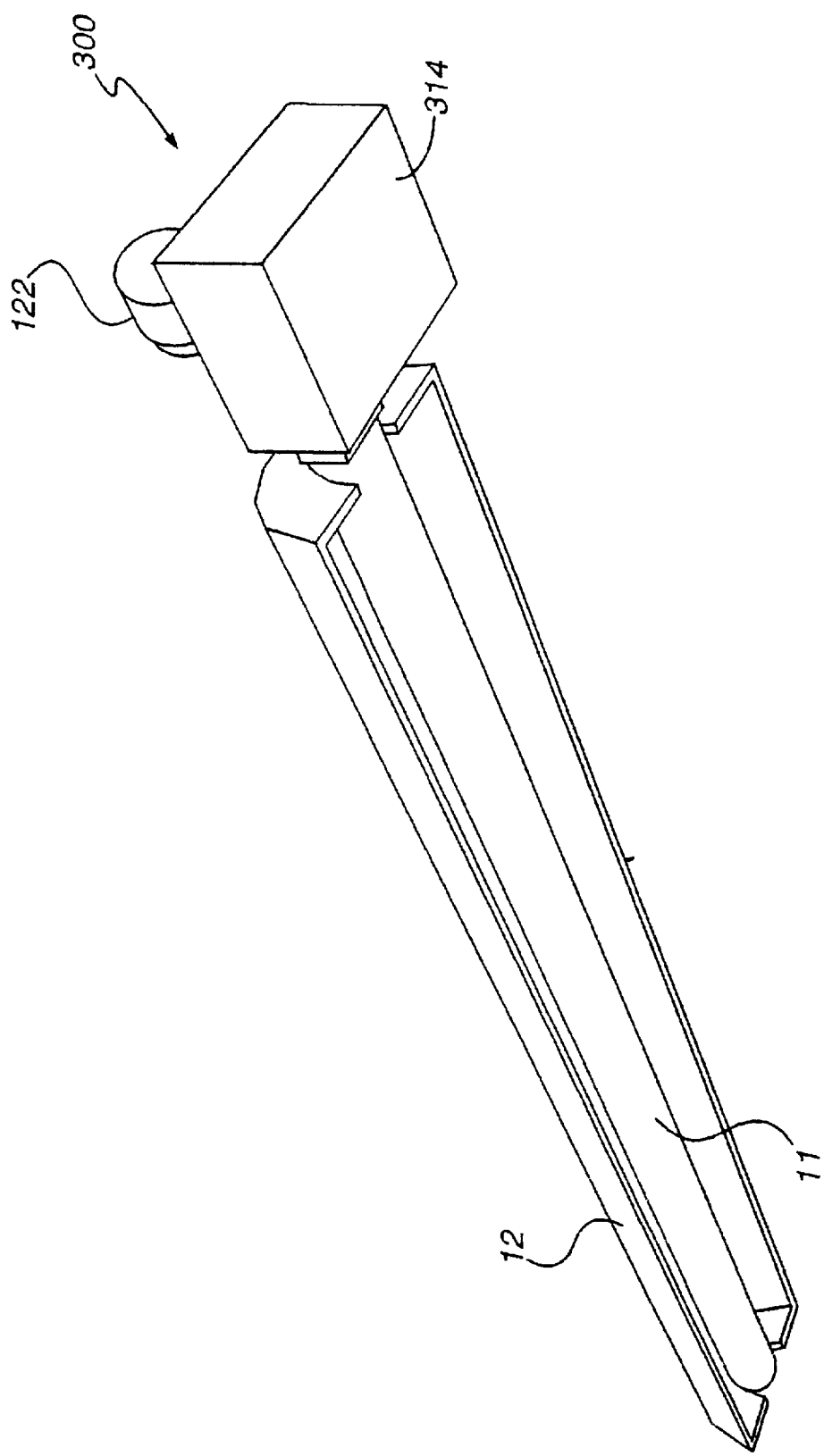
FIG. 3 is a perspective view of a prior art Gordon Ray®DF unitary sub-system having a single dual-stage gas burner (referred to herein as "Type 3"), manufactured by Roberts-Gordon of Buffalo, N.Y.

A third type of sub-system 300 is illustrated in FIG. 3. This unitary sub-system includes a single dual-stage gas burner 314 operatively arranged to ignite gas within a radiant tube 11, and a reflector 12 operatively arranged to reflect energy emitted by the radiant tube, and a blower 122 operatively arranged to force heat through radiant tube 11 and to exhaust products of combustion. This third type of sub-system is sold commercially under the trademark Gordon Ray®DF.

Figure 4:
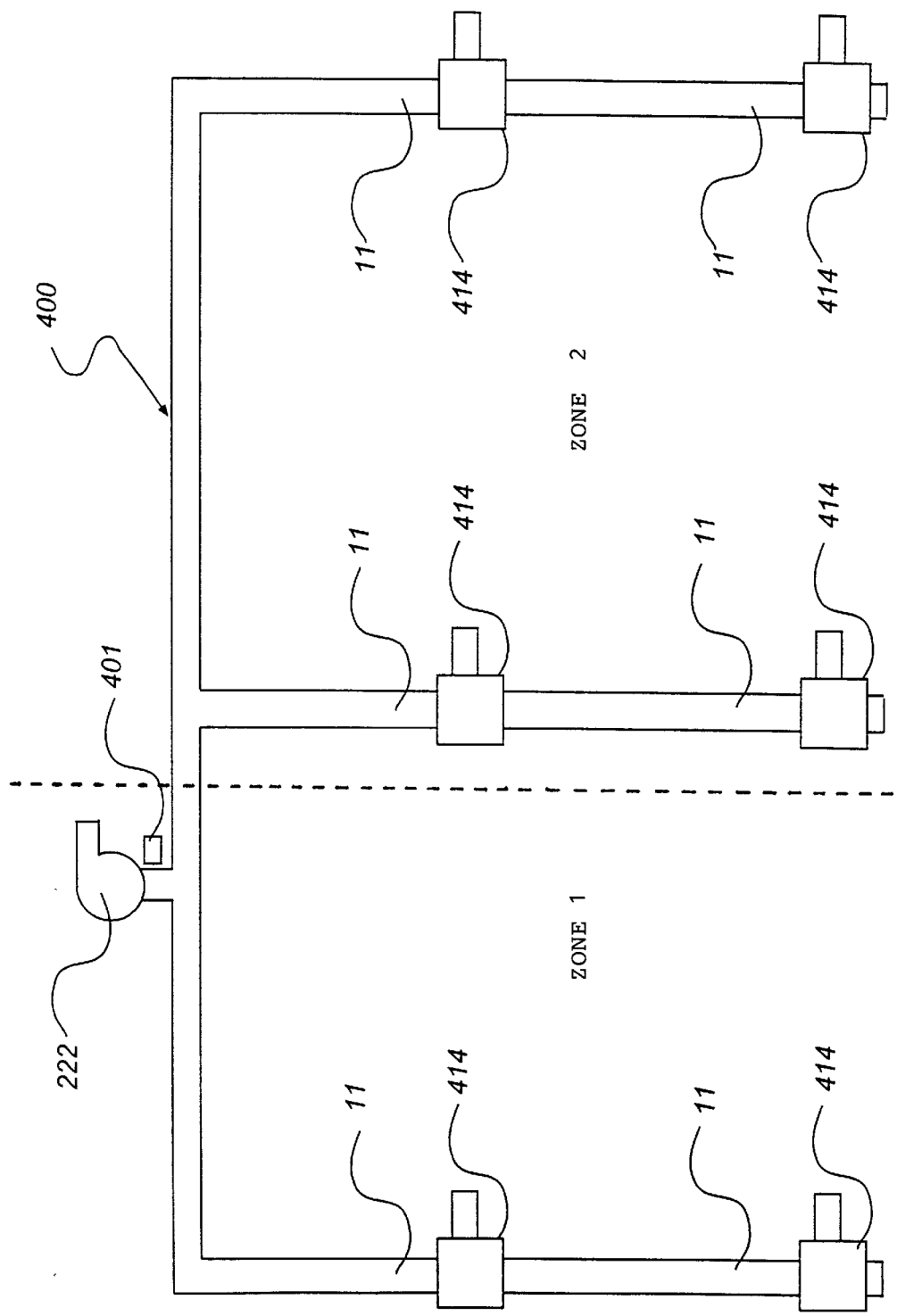
FIG. 4 is a perspective view of a prior art Co-Ray-Vac® brand radiant energy heating subsystem (referred to herein as "Type 4"), manufactured by Roberts-Gordon of Buffalo, N.Y.

A fourth type of sub-system 400, sold commercially under the trademark Co-Ray-Vac®, is illustrated in FIG. 4. This sub-system comprises a plurality of burners 414 operatively arranged in series to ignite gas within a series of connected radiant tubes 11, which plurality of burners are also arranged to fire simultaneously. This system also includes a common vacuum pump 222 having a pressure proving device 401 operatively arranged to prove the pressure within the system. By "proving" the pressure, it is meant that the vacuum pump is generating a predetermined static pressure at a predetermined location sufficient for safe evacuation of the products of combustion. The pressure device may be located proximate the pump or it may be located proximate the burners. The pump is operatively arranged to draw heat through the tubes 11, and to exhaust contaminants therefrom. In operation, it should be appreciated that one or more of the burners and associated tubes may be located in a separate heating zone within a building. For example, as shown in FIG. 4, two of the burners and their associated heating tubes may be located in a first heating zone, while the other four burners and their associated tubes may be located in a second zone. The vacuum pump and proving device are thus configured to operate both zones independently or to operate both zones together, depending upon the demand for heat within the building.

Figure 5:
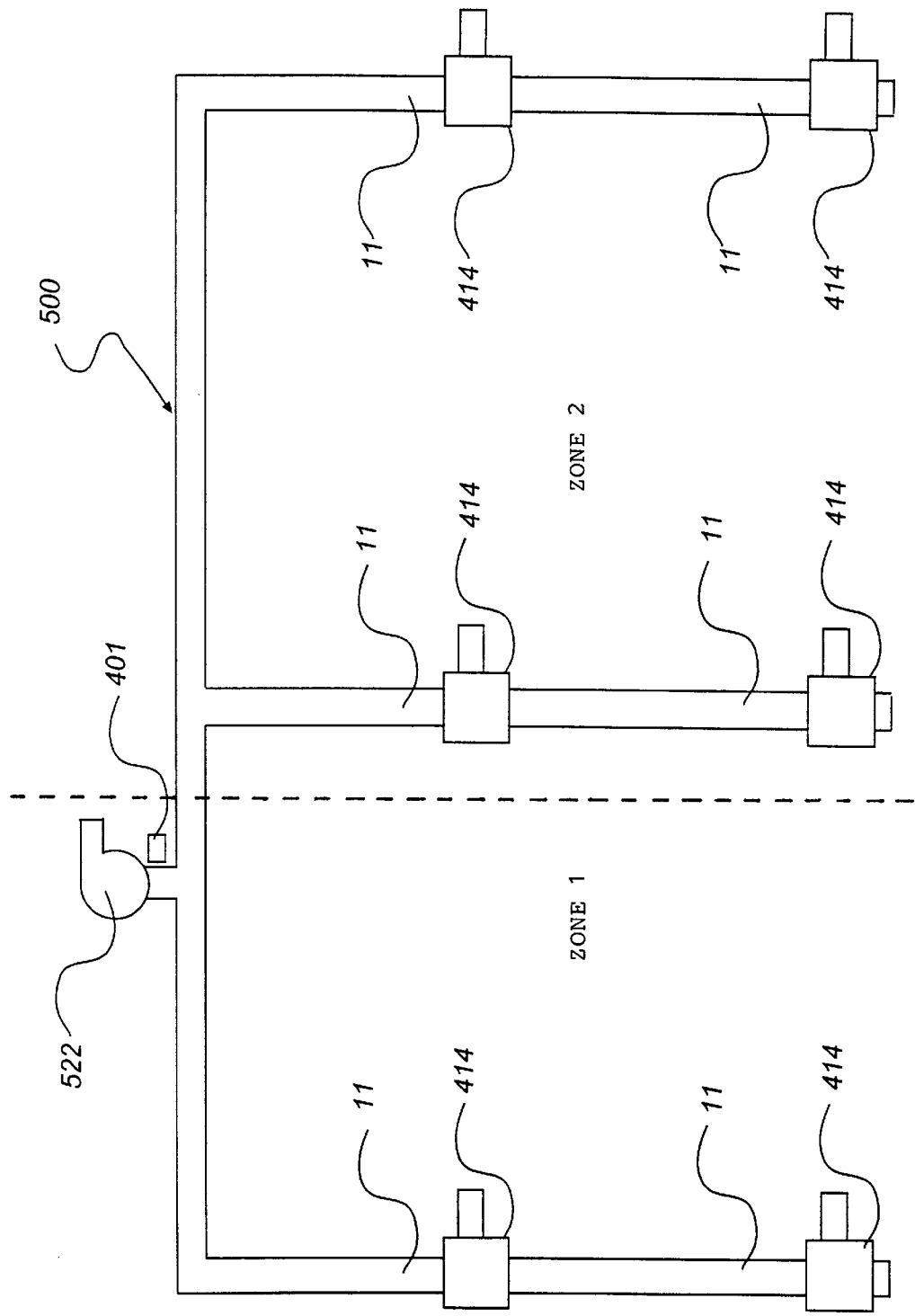
FIG. 5 is a perspective view of a prior art Ult-Ray-Vac™ brand unitary sub-system having a single dual-stage gas burner and a vacuum pump (referred to herein as "Type 5"), manufactured by Roberts-Gordon of Buffalo, N.Y.

A fifth type of sub-system 500, sold commercially under the trademark Ult-Ray-Vac™, is illustrated in FIG. 5. This sub-system comprises a plurality of burners 414 operatively arranged in series to ignite gas within a series of connected radiant tubes 11, which plurality of burners are also arranged to fire simultaneously. This system also includes a common vacuum pump 522 having a pressure proving device 401 operatively arranged to prove the pressure within the system. The pressure device may be located proximate the pump or it may be located proximate the burners. The pump is operatively arranged to draw heat through the tubes 11, and to exhaust contaminants therefrom. In operation, it should be appreciated that one or more of the burners and associated tubes may be located in a separate heating zone within a building. For example, as shown in FIG. 5, two of the burners and their associated heating tubes may be located in a first heating zone, while the other four burners and their associated tubes may be located in a second zone. The vacuum pump and proving device are thus configured to operate both zones independently or to operate both zones together, depending upon the demand for heat within the building. In this sub-system, vacuum pump 522 is driven by a variable frequency motor operatively arranged to control the vacuum within the system. The speed of the motor is varied in response to a predetermined relationship between the temperature measured external to the building and the heat input to the sub-system required to overcome the temperature differential.

Figure 6:
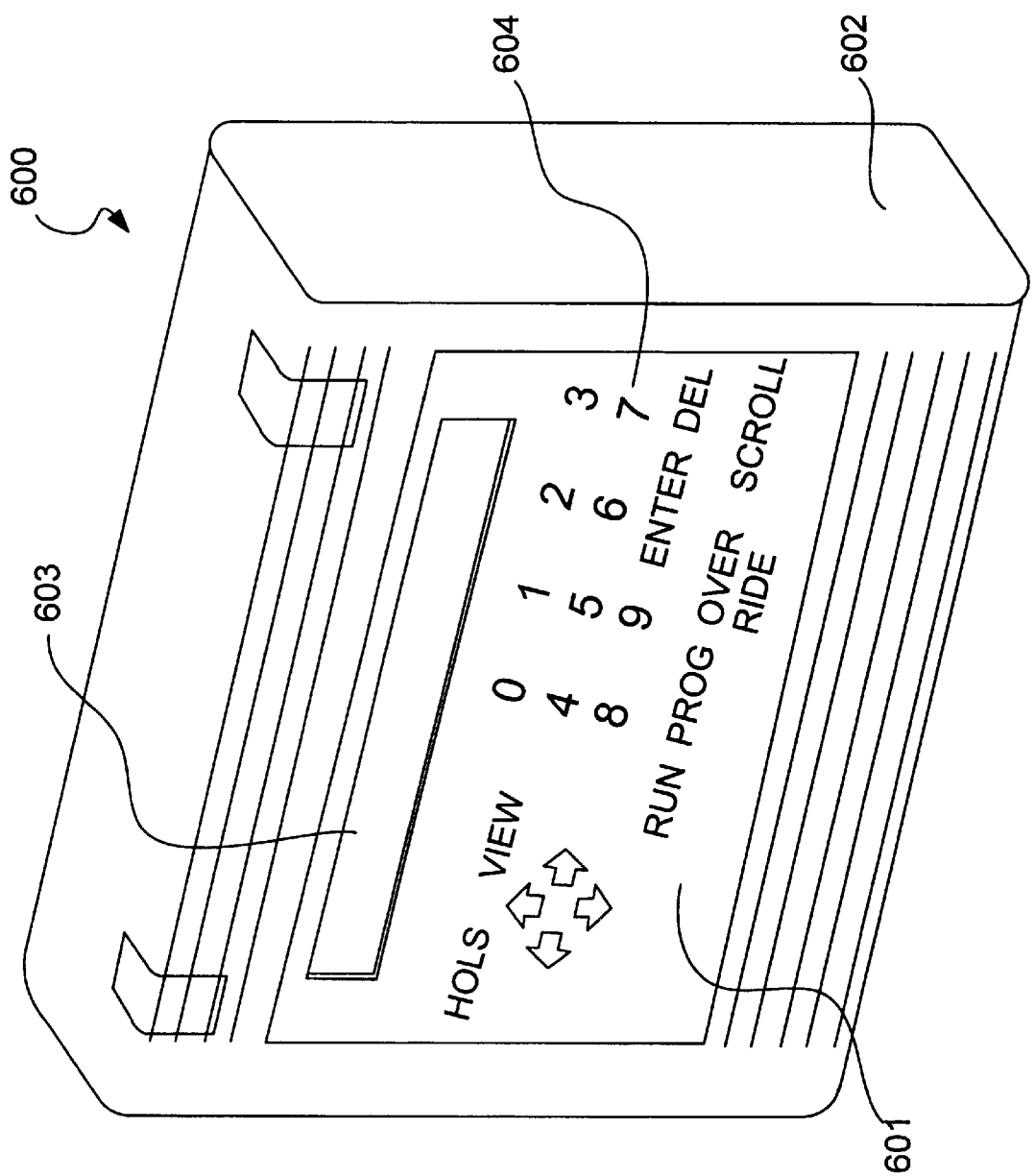
FIG. 6 is a perspective view of the solid state electronic control panel of the invention.

All of the sub-systems described above are controllable by the solid state control panel 600 shown in perspective view in FIG. 6. In fact, electronic control panel 600 is pre-programmed to control two or more of the above-described types of radiant heating sub-systems, and does in fact control one or more of the sub-systems. Mounted on the front face 601 of cabinet 602 in a preferred embodiment is 40×2 liquid crystal display 603 and keypad 604 (which comprises 22 keys). System settings including: heating time periods, temperature settings, sub-system sequencing, etc., and are entered via this user interface.

Figure 7:
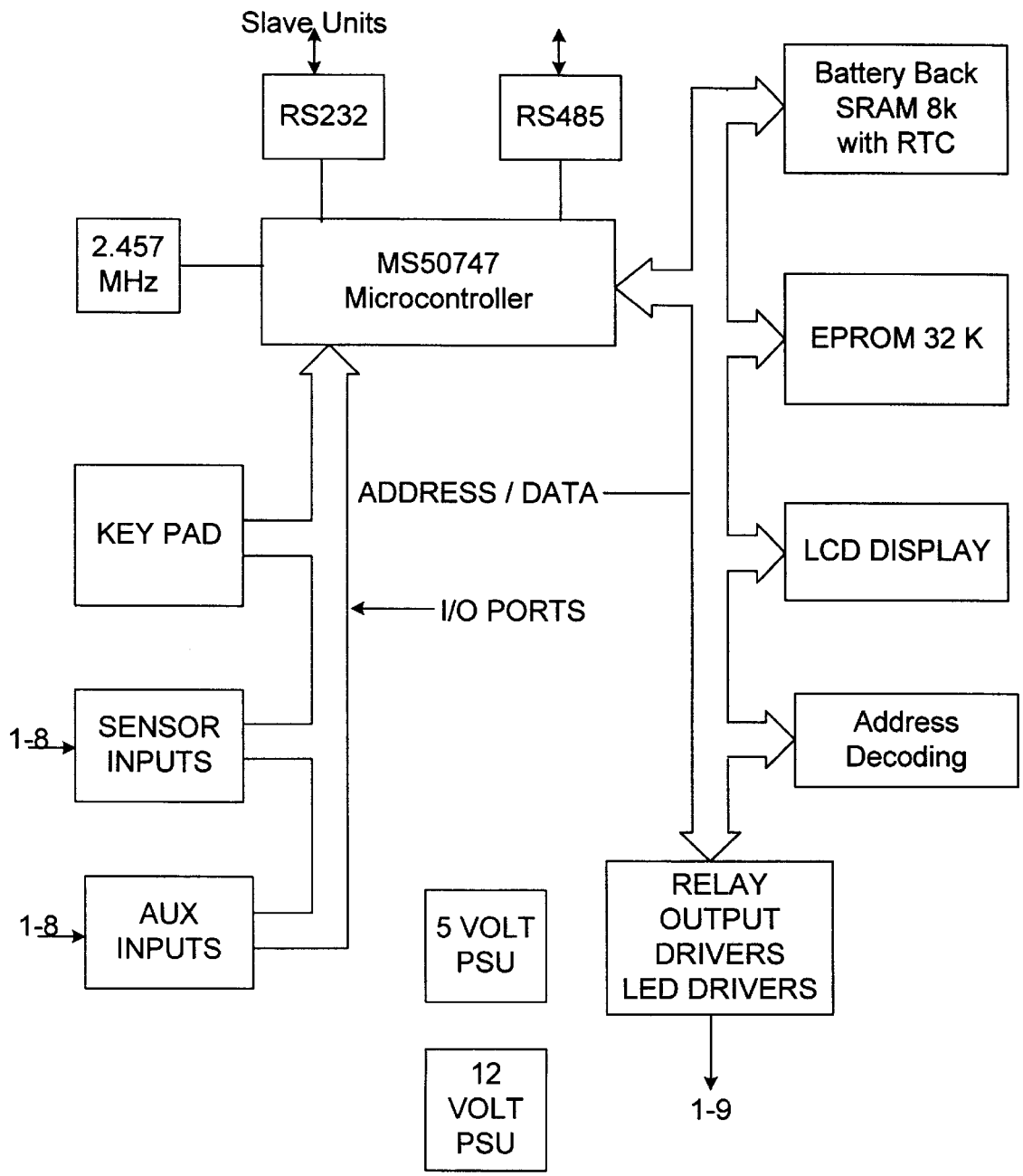
FIG. 7 is a block diagram of the electronic circuit of the control panel of the invention.
Figure 8A:
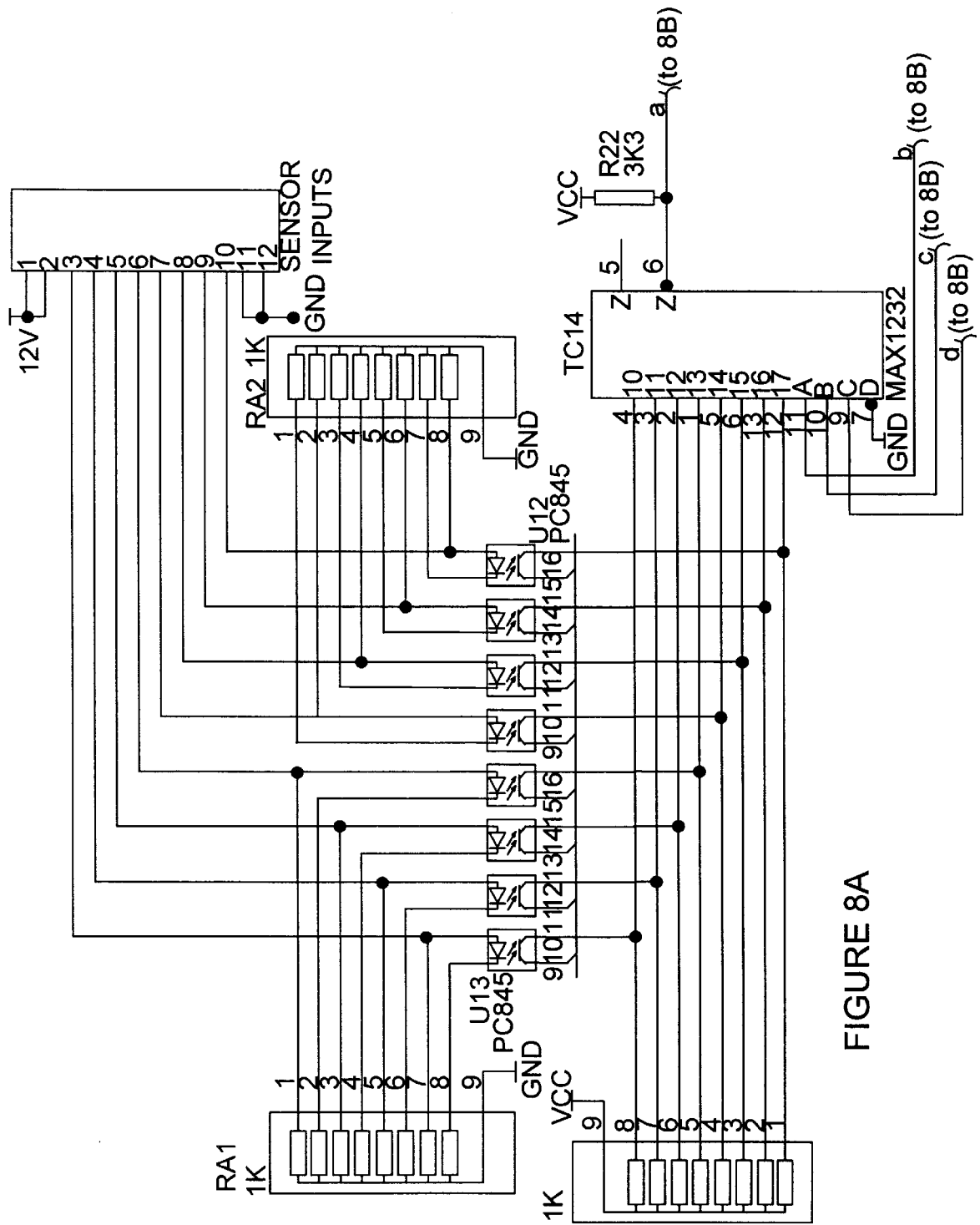
FIGS. 8A–8J are schematic diagrams of the electronic circuit of the control panel of the invention.
Figure 8B:
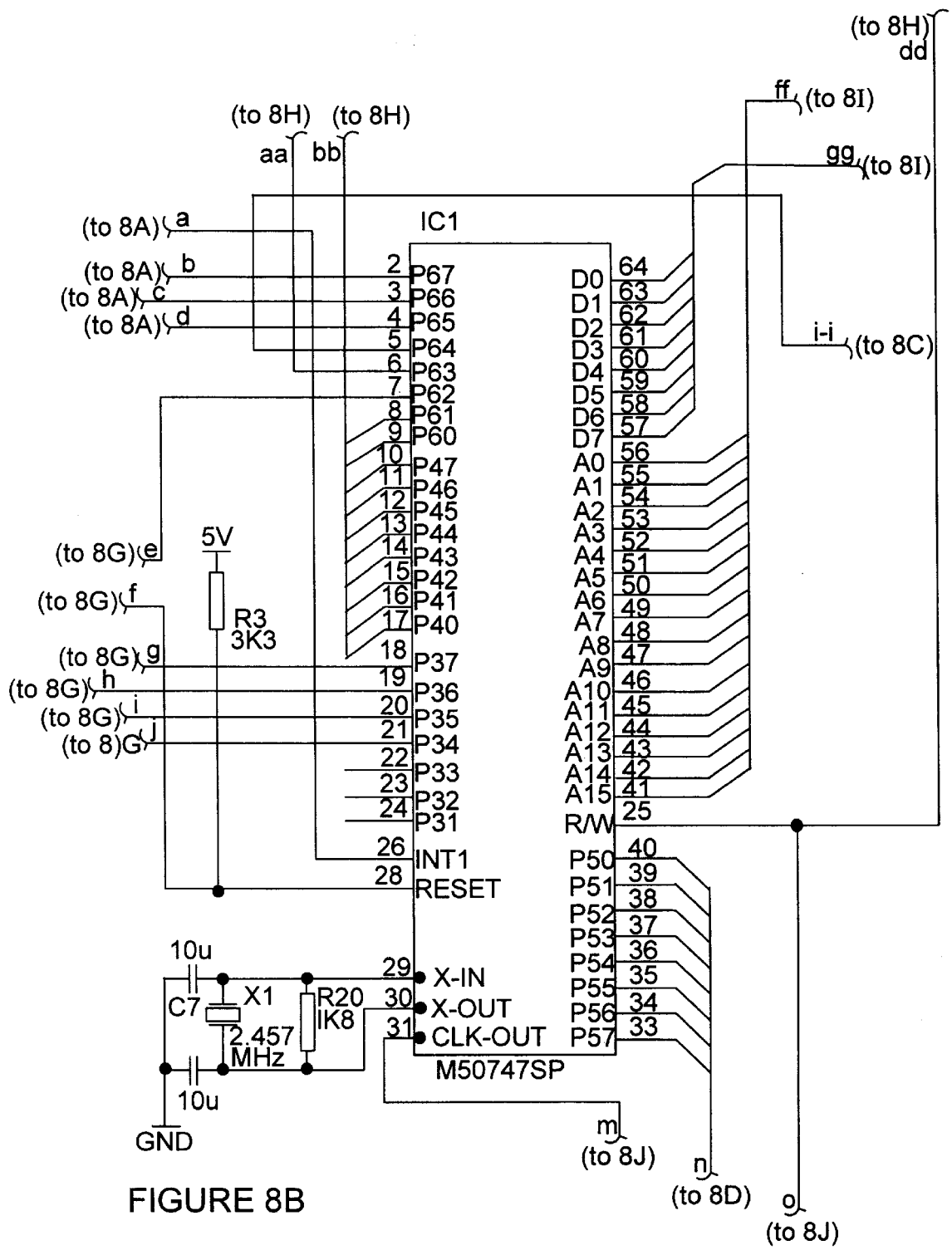
Figure 8C:
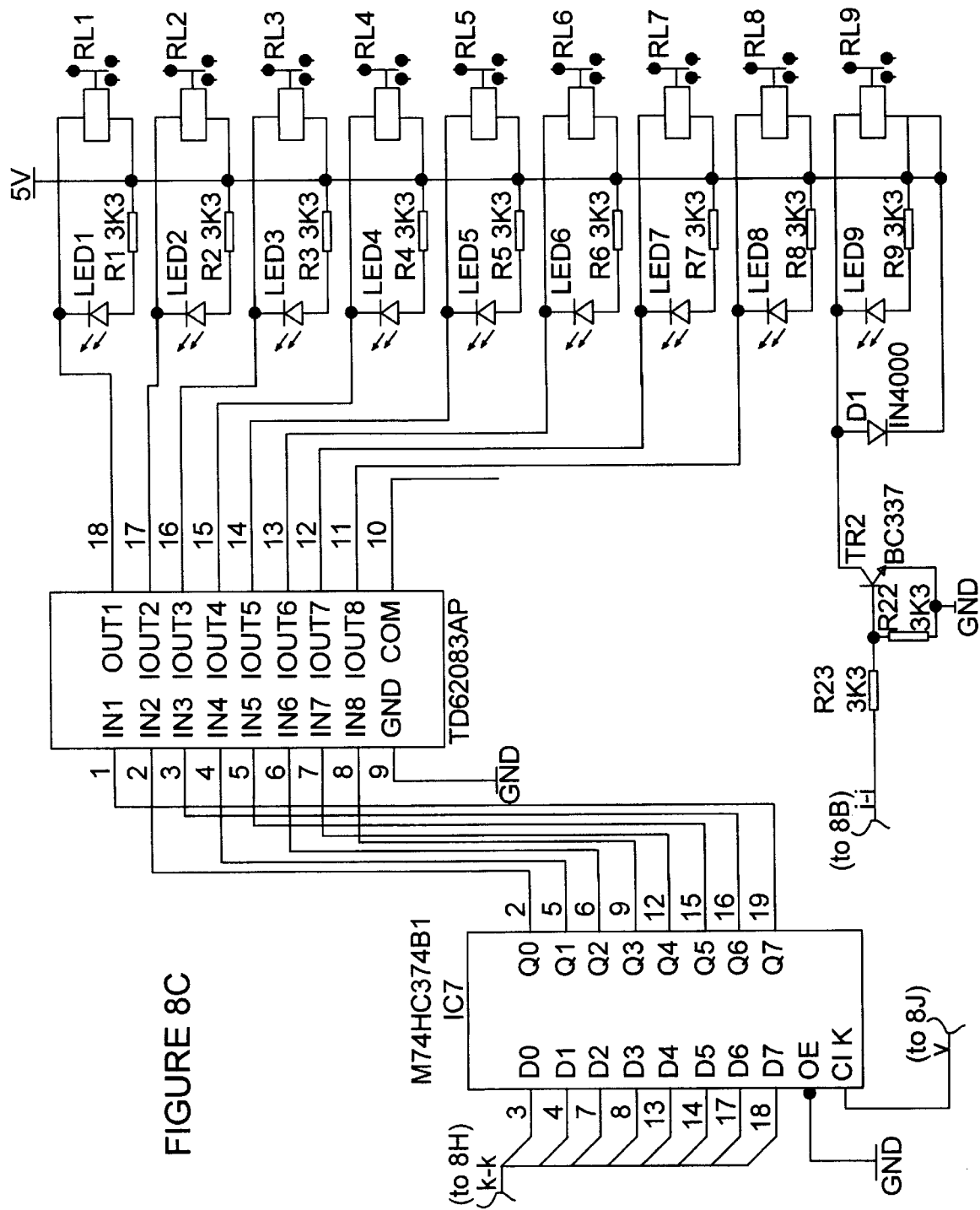
Figure 8D:
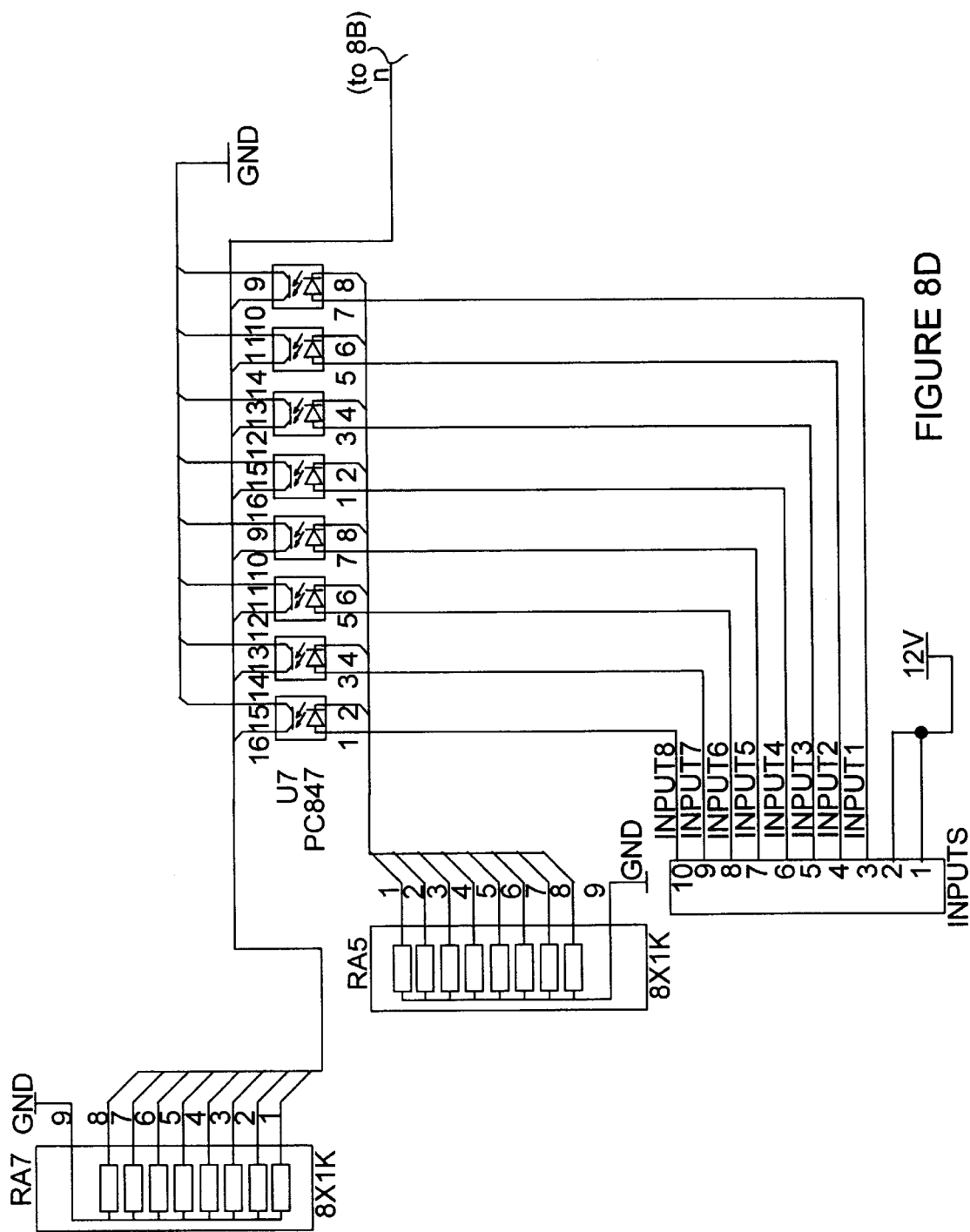
Figure 8E:
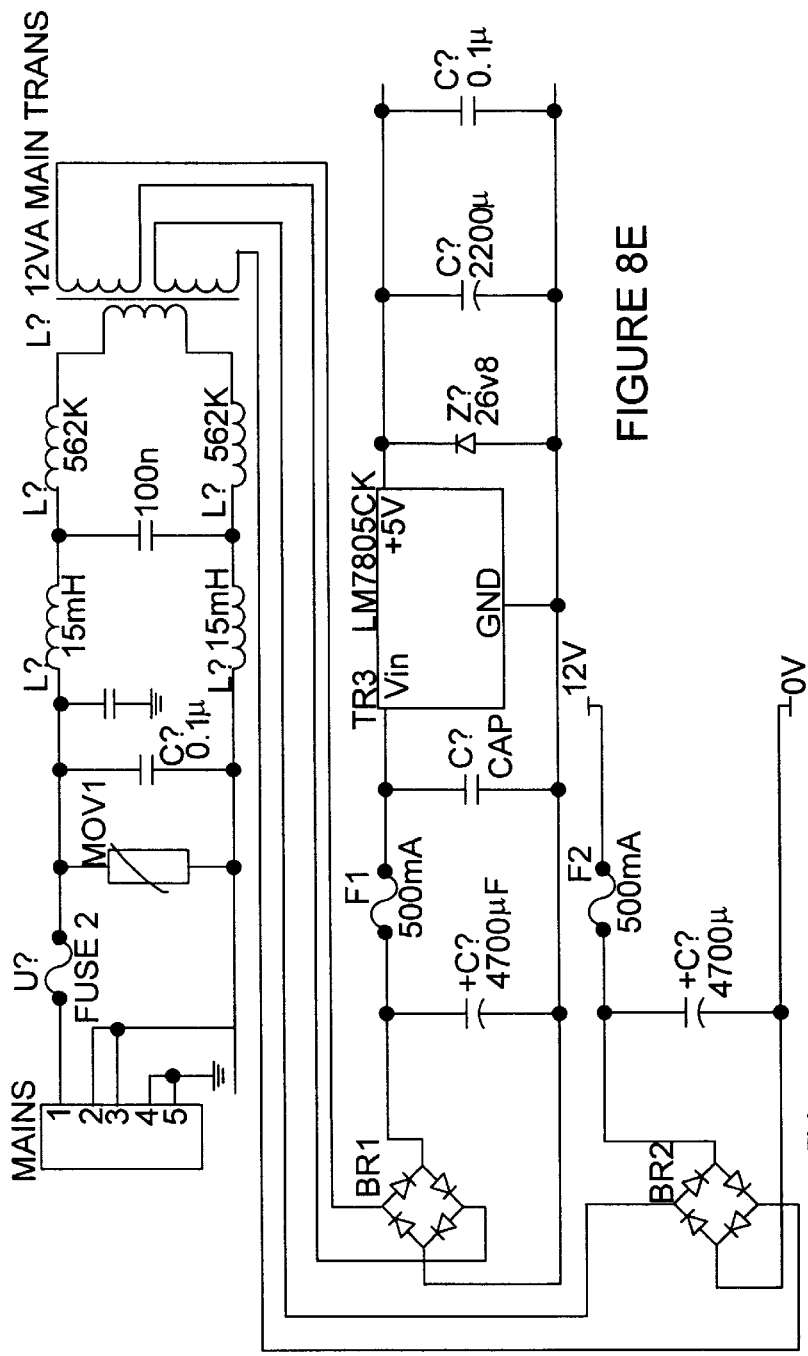
Figure 8F:
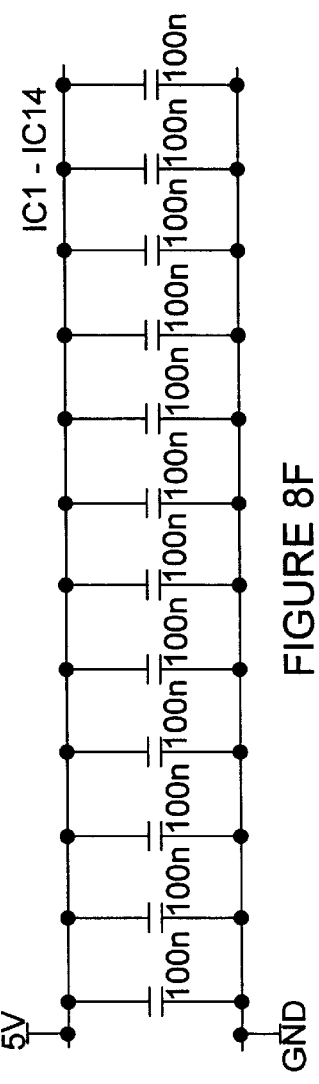
Figure 8G:
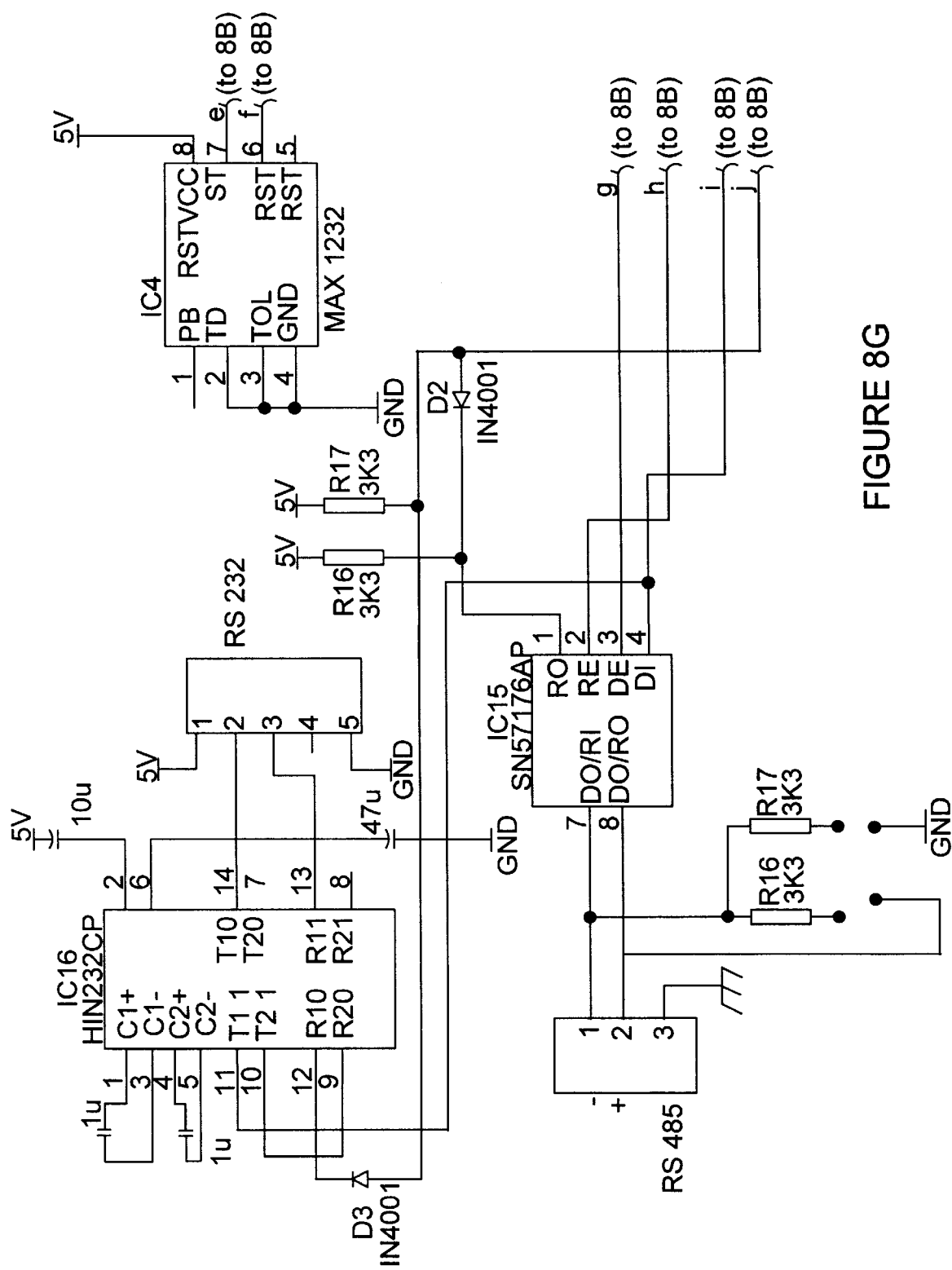
Figure 8H:
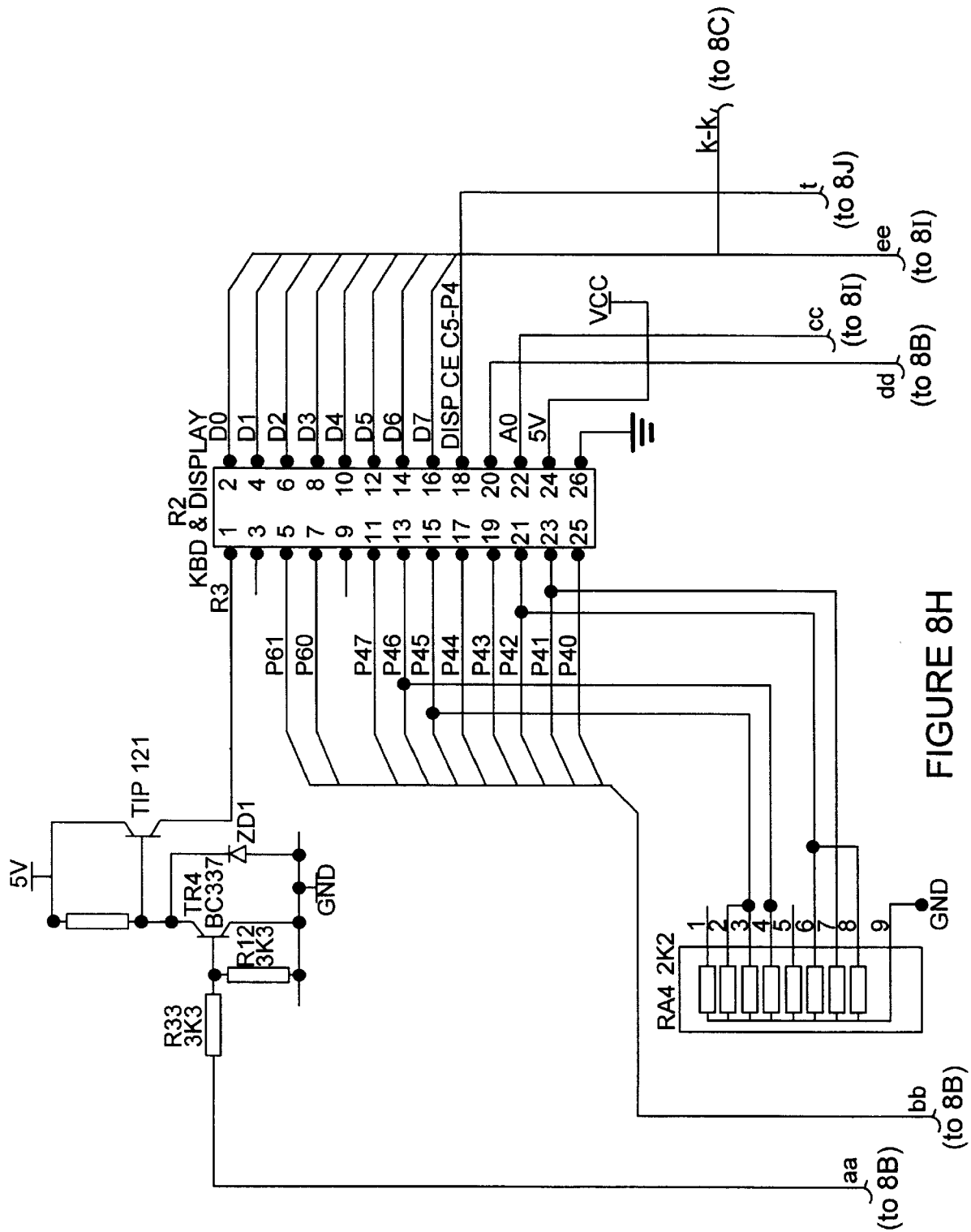
Figure 8I:
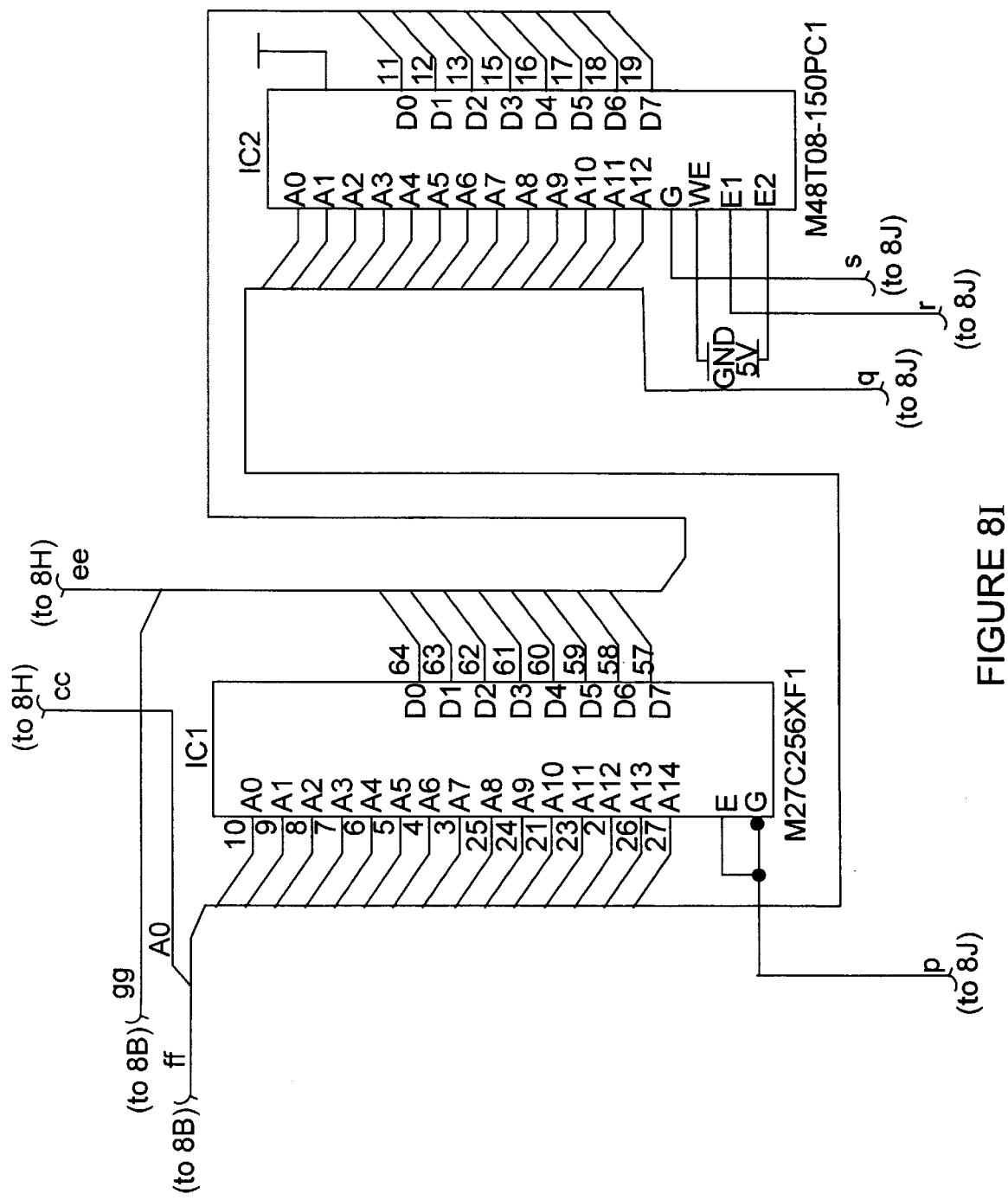
Figure 8J:
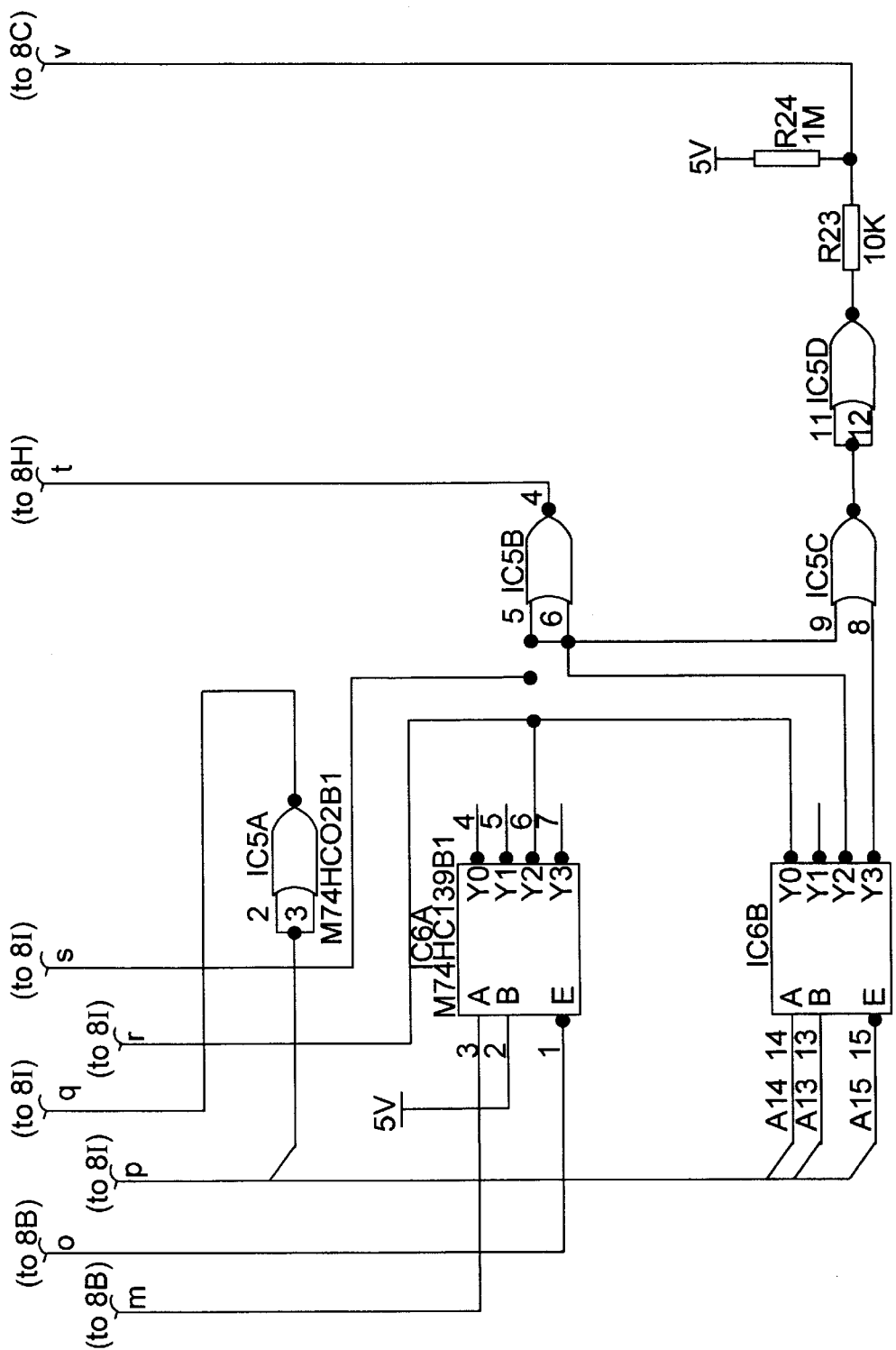

A block diagram of the control panel is shown in FIG. 7. The control panel has eight digital sensor inputs for connection to room temperature sensors, flow sensors and external temperature sensors. In addition, eight voltage free sensors (auxiliary inputs) are provided for general purpose switched inputs such as alarms and interlocks. There are also nine voltage free relay outputs configurable for normally open or normally closed operation.

An RS 232 serial communications interface is included for optional connection to a modem. This feature gives control and monitoring facilities, remotely via the phone line.

For larger installations, additional units can be added and configured as slaves. The connection is made via an RS-b 485 interface.

We begin a description of the control panel by describing the circuit enclosed therein. Adverting now to FIGS. 8A–8J, the control system is based on an 8-bit microprocessor, IC1. In a preferred embodiment, the device is a single chip microcomputer designed with CMOS silicon gate technology, such as Model No. M50747SP, or equivalent. An external crystal provides a clock of 2.4576 MHz. The microprocessor externally addresses 32,768×8 bit bytes of erasable read only memory, IC2, dedicated to program memory for the control panel. The code stored in IC2 is contained in the attached microfiche appendix. The microprocessor also addresses 8192×8 bit bytes of non-volatile random access memory, IC3. On board the RAM is a real time clock module driven by a quartz controlled oscillator with a frequency error of no greater than +/−35 parts per million. The device includes a lithium battery backup.

IC4 is a supervisory or "watchdog" circuit and provides microprocessor housekeeping and power supply supervision. A digitally programmable timer monitors software execution and can be programmed for time out settings of 150 ms, 600 ms, or 1.2 sec. A power on reset pulse of greater than 250 ms is output, at power up, power down and during low voltage brown out conditions.

IC16 provides an asynchronous serial communications port. The serial communications port meets all RS-232E and V.28 specifications. The device converts the CMOS logic levels of 0/5 volts from the microprocessor UART circuit into the RS232 compatible levels of +10 volts and −10 volts.

The +10 and −10 volts supply is generated by a charge pump voltage converter. A single 5V supply is required for the IC. The line receivers can handle up to +/−30 volts, and have a 3000-ohm input impedance. The receiver's feature hysteresis in order to improve noise rejection. This communications port is provided for connection to an external modem for control and monitoring purposes.

IC15 provides a second asynchronous serial communications port and gives a high-speed differential tri-state bus/line transceiver capability to the unit. The transceiver is designed to meet the requirements of EIA standard RS485 with extended common mode range of +12 volts to −7 volts, for multipoint data transmission. It is also compatible with the RS422 requirements. Up to 32 transceivers may be present on the bus. In the event of over heating due to bus contention or for other fault conditions, a thermal shutdown circuit forces the driver into its high impedance state. This communications port is used for connecting to slave control panels.

Figure 9:
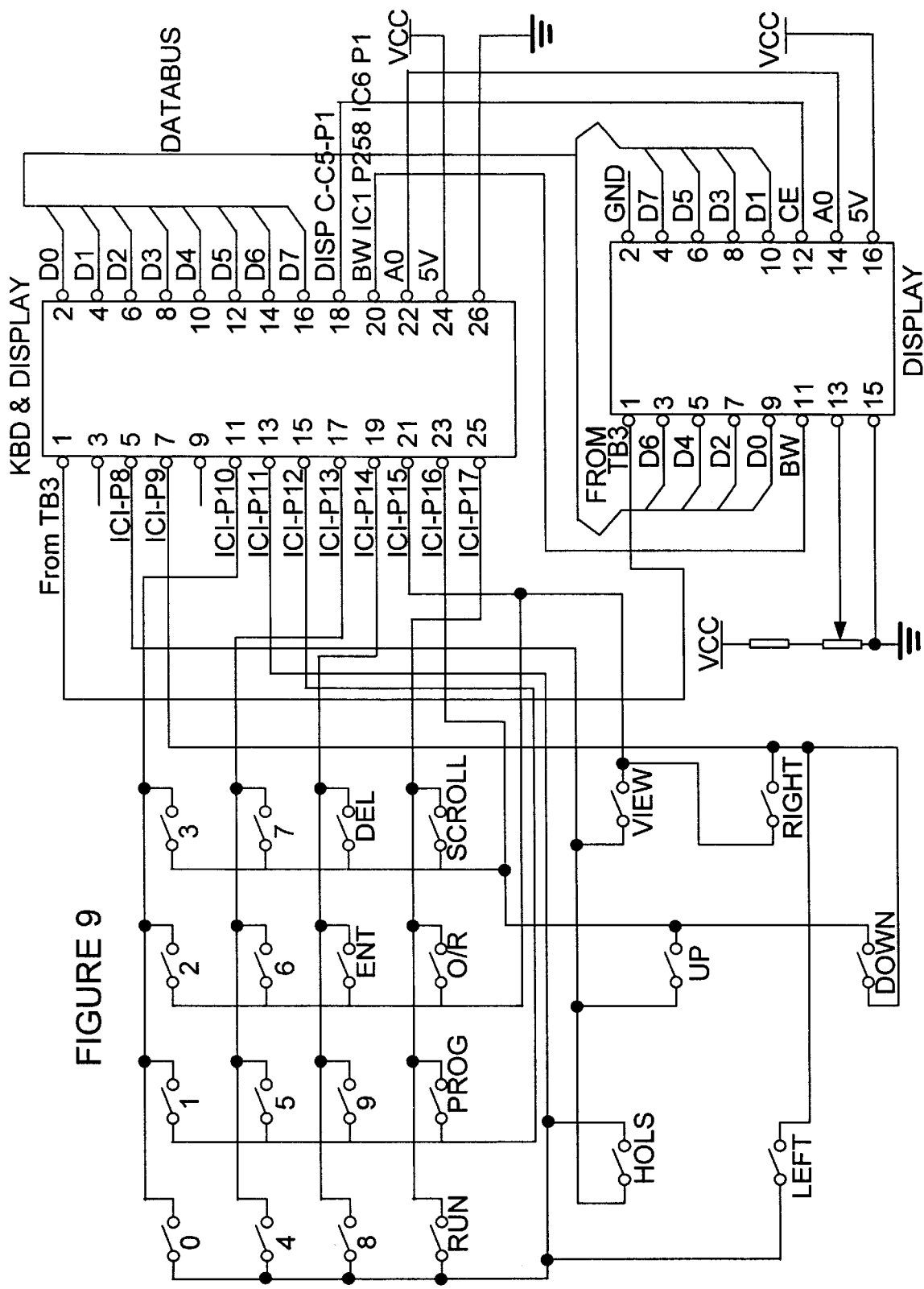
FIG. 9 is a schematic diagram of the electronic circuit of the display and keypad of the control panel of the invention.

Adverting now to FIG. 9, an intelligent alphanumeric 40×2 display, software driven, is mapped onto the microprocessor's memory via the address and data buses. The device has a wide viewing angle and back lighting. The backlight is enabled with the first key press and extinguished automatically a few seconds after the last keystroke. The backlight is driven by the microprocessor output port via transistors TR3 and TR4. The backlight intensity level is set by variable resistor VR1. All the control panel settings are entered via the front panel keypad. Numeric keys 0 to 9, Enter, DEL, RUN, PROG, OVERRIDE, and SCROLL. Also provided are cursor keys left, right, up, down, HOLS and VIEW. The switches are wired to form an electrical matrix of rows and columns. This matrix is connected to the input ports of the microprocessor, which determines the active key and takes the necessary action.

Adverting again to FIGS. 7 and 8A–8J, the control panel includes eight optically isolated inputs with a maximum isolation voltage of 5000 Vrms. The maximum working voltage applied to these inputs should be no greater than 20 volts. A typical active "on" voltage would be 12 volts dc. Each of the open collector outputs from the opto isolators are pulled up to the 5-volt supply rail via a 1 kΩ resistor. The outputs are fed into IC14, and 8 to 1 multiplexer. The output of this multiplexer is read by the microprocessor on one of its input ports. The one of eight selection is by three output ports from the microprocessor to the multiplexer. The digital signal from the connected sensors has a frequency proportional to the measured temperature.

The control circuit also includes an additional eight optically isolated inputs. The electrical characteristics are the same as the sensor inputs described above. The outputs from the opto isolators are fed directly into the input ports of the microprocessor, and not via a multiplexer as is the case with the sensor inputs. These inputs are used for system alarm and interlocks, etc.

The control circuit includes nine relay outputs, marked "Relay Outputs" and "Aux Relay Outputs". All the outputs are voltage free. Seven outputs can be wired for normally open or normally closed operation. The remaining two are arranged for normally open operation. The relays are driven by the microprocessor. IC7 is a tri-state 8-bit latch and is memory mapped onto the microprocessor's data bus. The outputs from the latch drive an 8-channel Darlington sink driver IC with integral clamp diodes for driving the relay coils. The ninth relay is driven by transistor TR7 and its associated circuitry.

The control circuit power supply is arranged with conventional filtering and overvoltage protection at its input. There are two 12-volt dc outputs. One is the supply to the external 12 VDC output, the other feeds a V regulator TR3 and its associated circuitry. This supplies all on-board logic and the microprocessor. The power supply is fused at its input and both low voltage outputs.

Operation

In a preferred embodiment, individual control panels as described above are arranged to be controlled from a central computer, such as a PC. One such individual panel 600 is shown in perspective view in FIG. 6. A software program, known herein as the "Roberts-Gordon™ BZC Energy Management System" controls all the panels. The code is disclosed in the attached appendix.

The energy management computer interface for the BZC software is capable of linking up to 99 stations. The communication is via a twisted screen pair cable, which is linked between communicating stations back to a communication box at distances up to 500 meters. Of course, coaxial cable could be used as well.

The software enables the building user to receive and view any changes which have been made at any BZC station and to make changes at their computer to send to any BZC station. The software is designed to enable the customer to choose if the site layout is displayed or not.

The BZC Management System has the following screens:
Overview screen, zone status and temperature readings.
Detailed zone/station view showing switching times.
Holiday periods setting screen.
Engineers set up screen for positioning devices and zone information.
Graph indicating temperatures sensed for the prior 24-hour period.
Graph indicating hours run per zone for a 4-week period.

The program screens and settings are described as follows:
Login screen (FIG. 10)
The login screen enables the end user to enter under three levels of security.
No password allows entry to view screens and alter nothing
User password gives access to all screens except the set up screen and allows altering of setting in the accessible screens.
Engineer's password allows entry to all screens and allows alteration of all settings.

Figure 10:
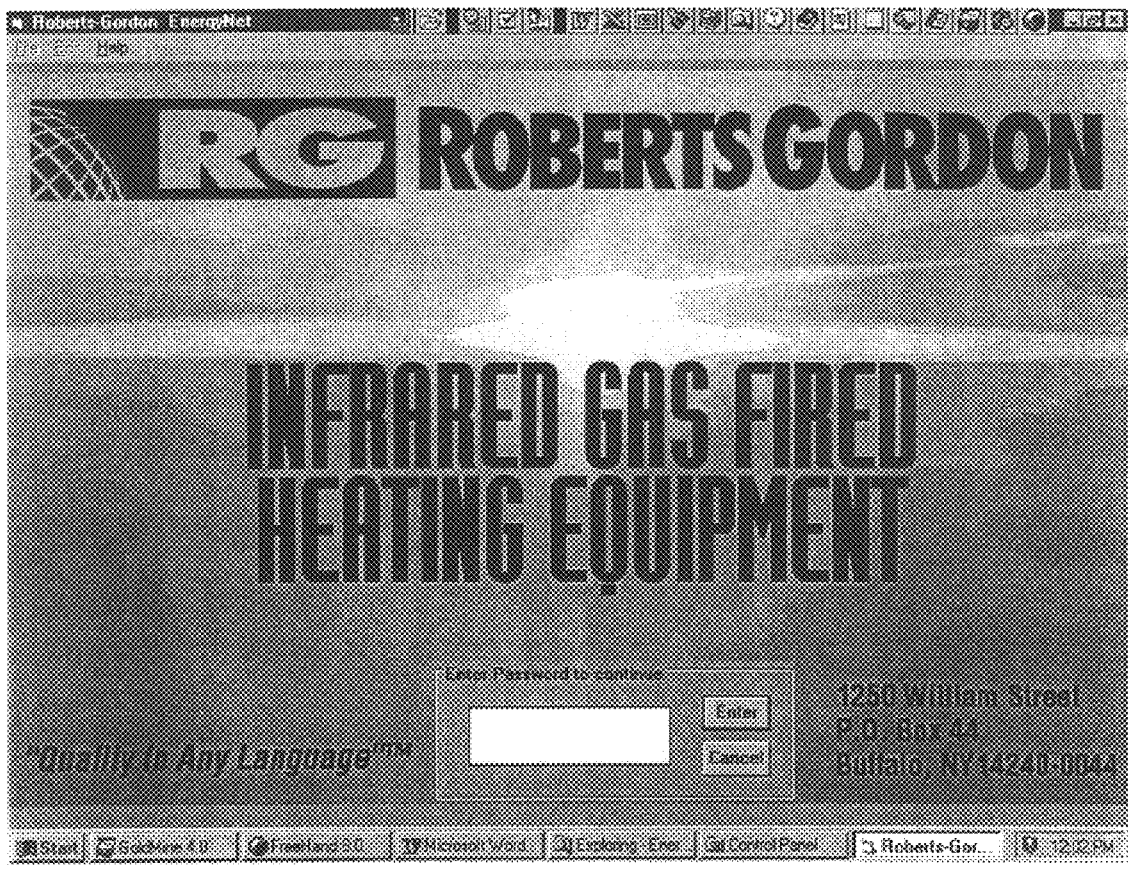
FIG. 10 is a screen capture of the login screen of the computer program of the invention.

The login screen shown in FIG. 10 permits the user to change his password.

Figure 11:
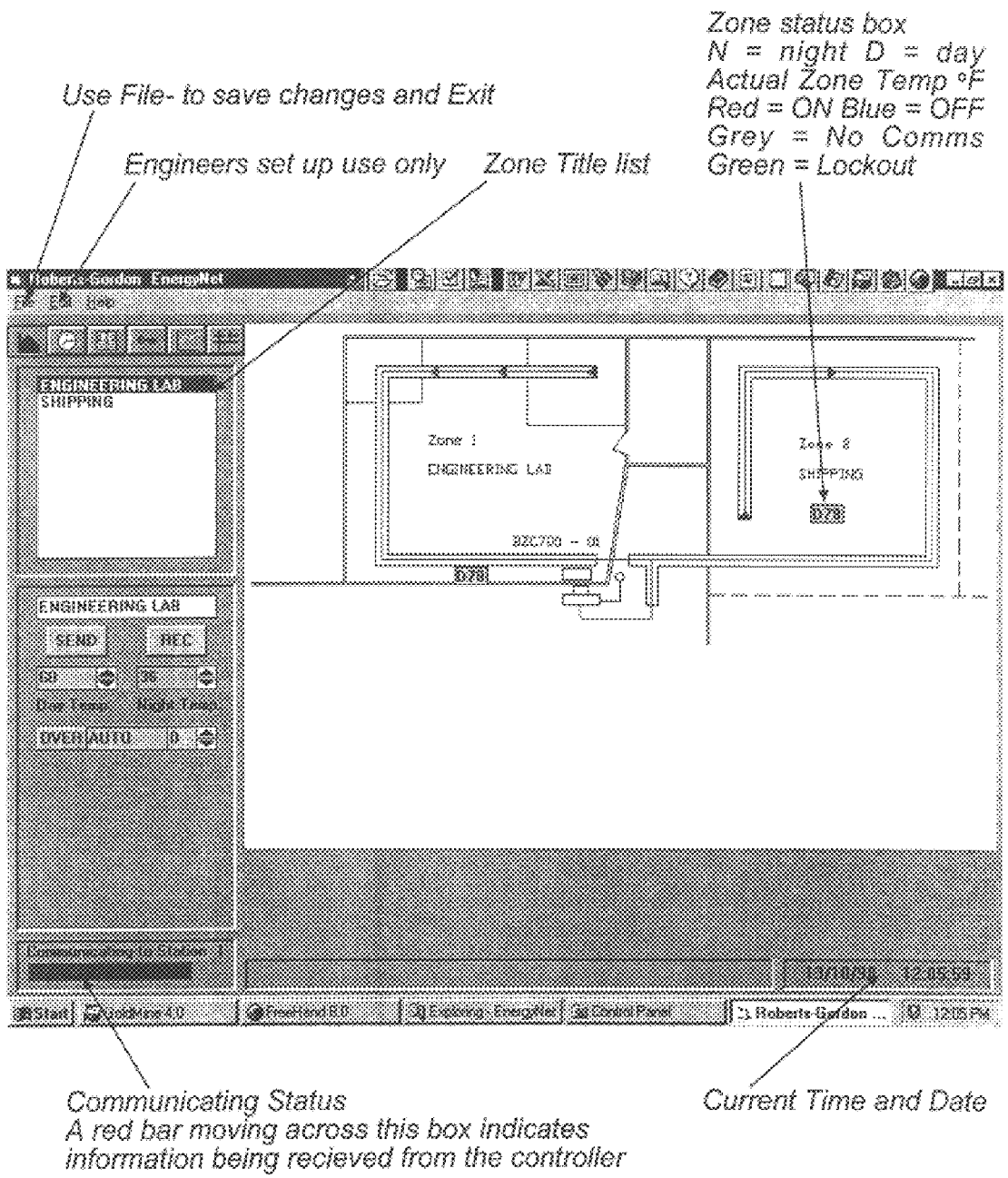
FIGS. 11 and 12 are screen captures of the overview screens of the computer program of the invention.
Figure 12:
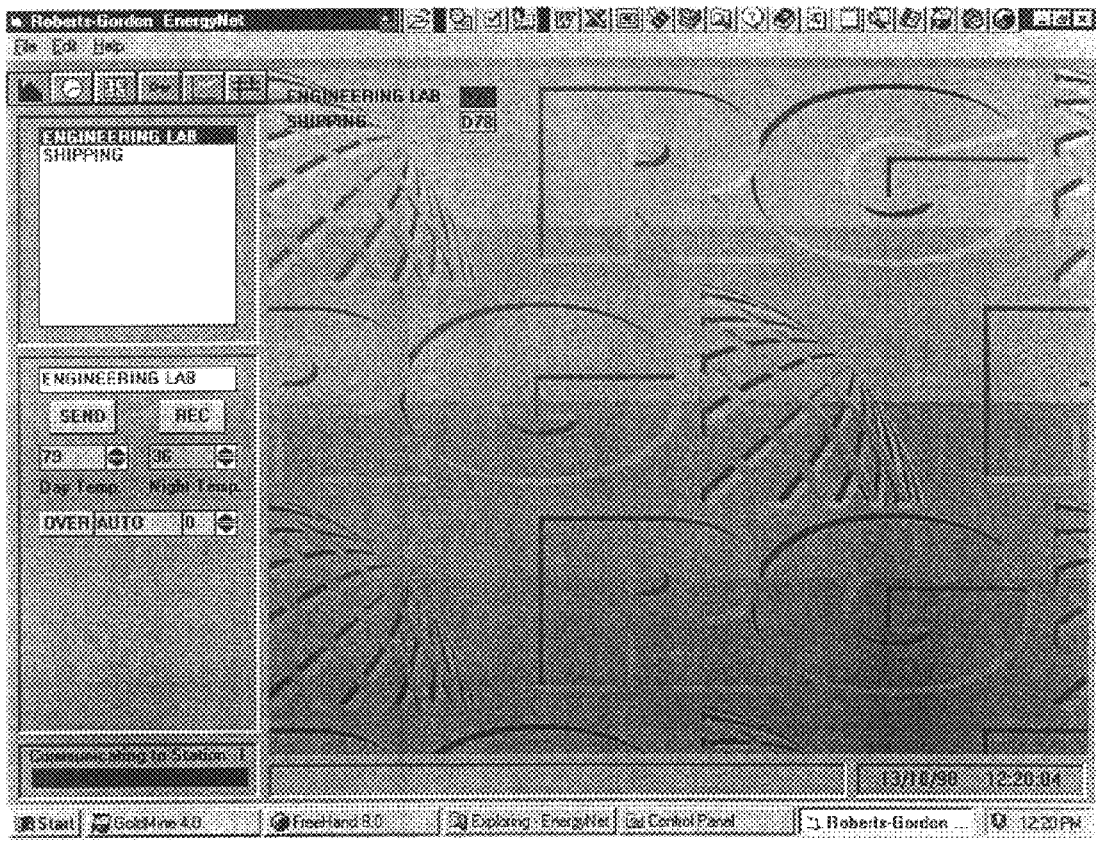

Overview Screen (FIGS. 11 and 12)

The overview screen enables the user to quickly view all the zones on a single site and view their status. This includes the running condition, time status and sensed temperature. The screen shown in FIG. 11 illustrates how the screen would appear if the layout display method is selected whereas the overview screen shown in FIG. 12 illustrates how the screen would appear if the layout display method is not selected. The screen shown in FIG. 12 has the same features as the layout drawing equivalent.

Figure 13:
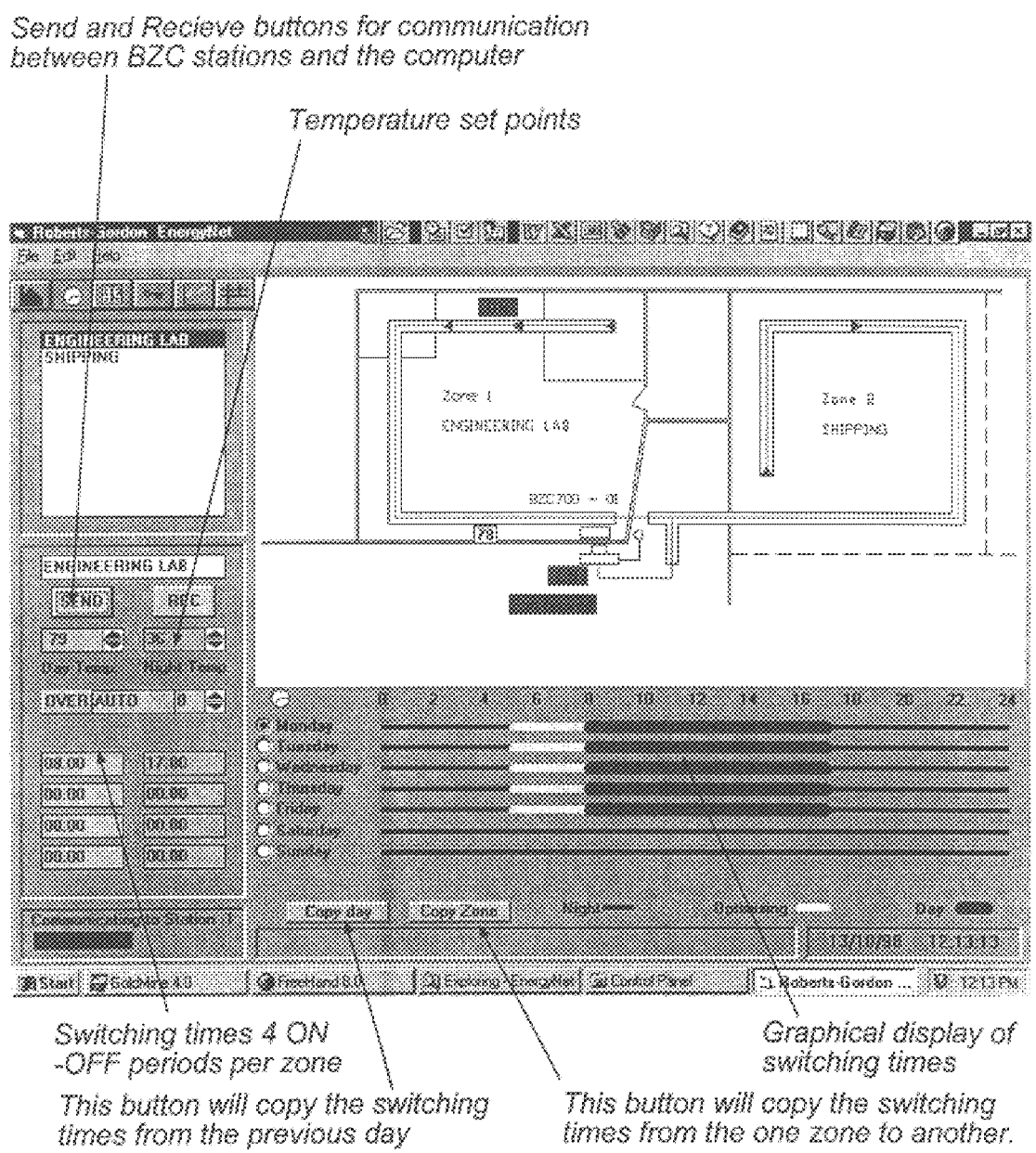
FIGS. 13 and 14 are screen captures of the time screens of the computer program of the invention.
Figure 14:

Time Screen (FIGS. 13 and 14)

The time screens shown in FIGS. 13 and 14 enable the user to view detail of all the zones from a selected station and view their status. This includes the ON/OFF indication of devices, sensed temperature and status of selected inputs. The screen shown in FIG. 14 illustrates how the screen would appear if the layout display method is selected whereas the time screen shown in FIG. 14 illustrates how the screen would appear if the layout display method is not selected. The screen shown in FIG. 14 has the same features as the layout drawing equivalent. (Note that the screen shown in FIG. 14 is a simple schematic designed to represent a CoRayVac® system. The schematic is automatically defined by the selection of CRV for this zone during configuration.)

Figure 15:
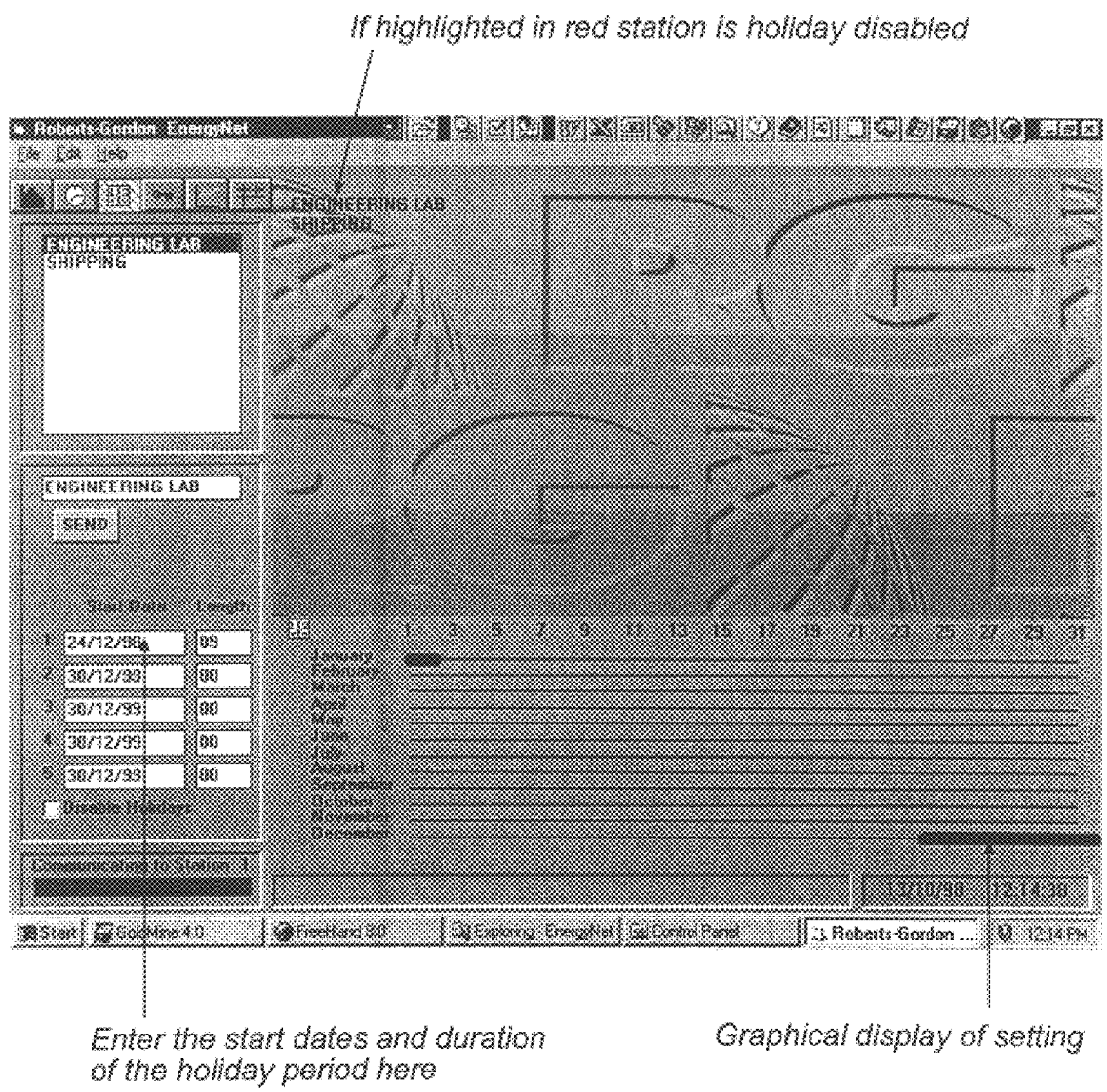
FIG. 15 is a screen capture of the holiday screen of the computer program of the invention.

Holiday Screen (FIG. 15)

The Holiday screen shown in FIG. 15 enables the user to set and review up to five preset holiday periods. The screen also enables the user to select stations for which holiday periods do not apply (e.g., Maintenance departments, etc.) The screen shown in FIG. 15 is an example of how the screen would appear if the station selected has holidays disabled.

Figure 16:
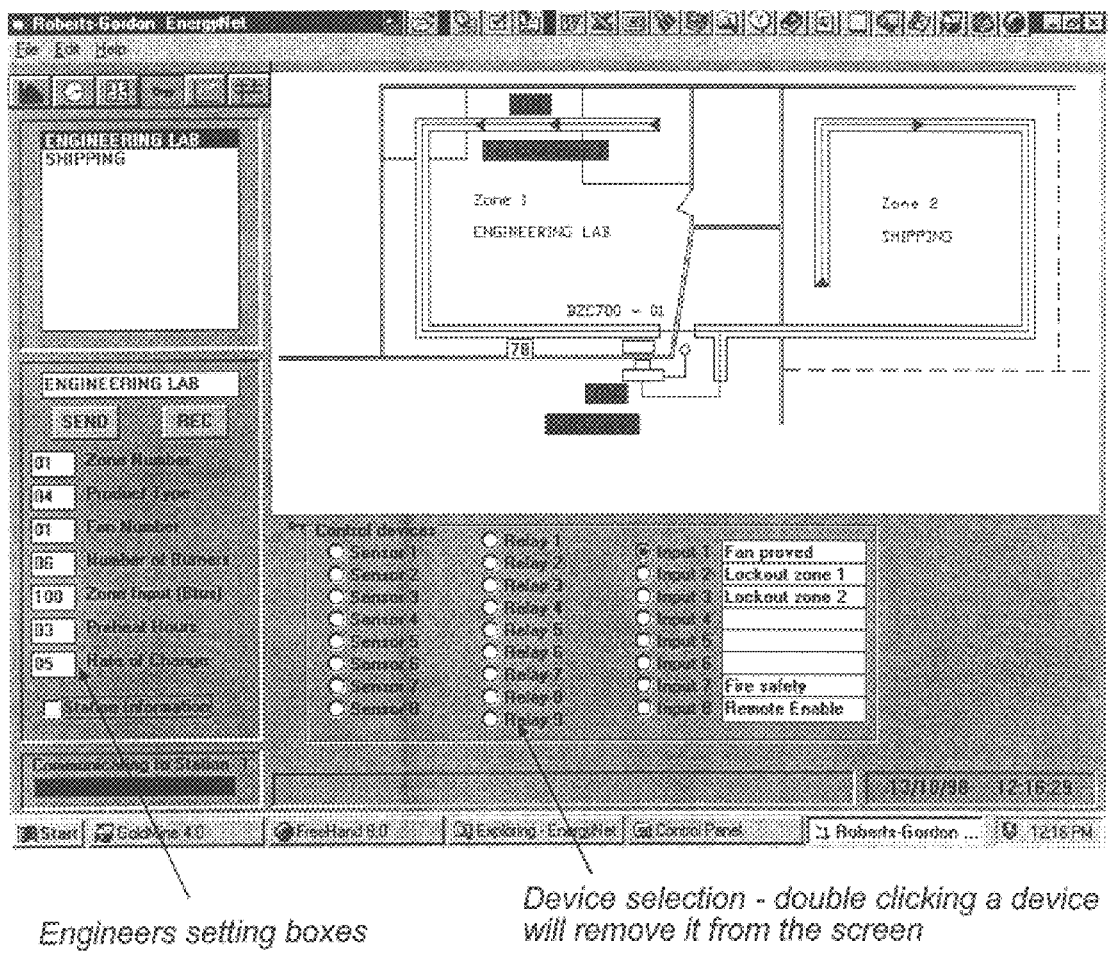
FIGS. 16 and 17 are screen captures of the engineer's set-up screen of the computer program of the invention.
Figure 17:
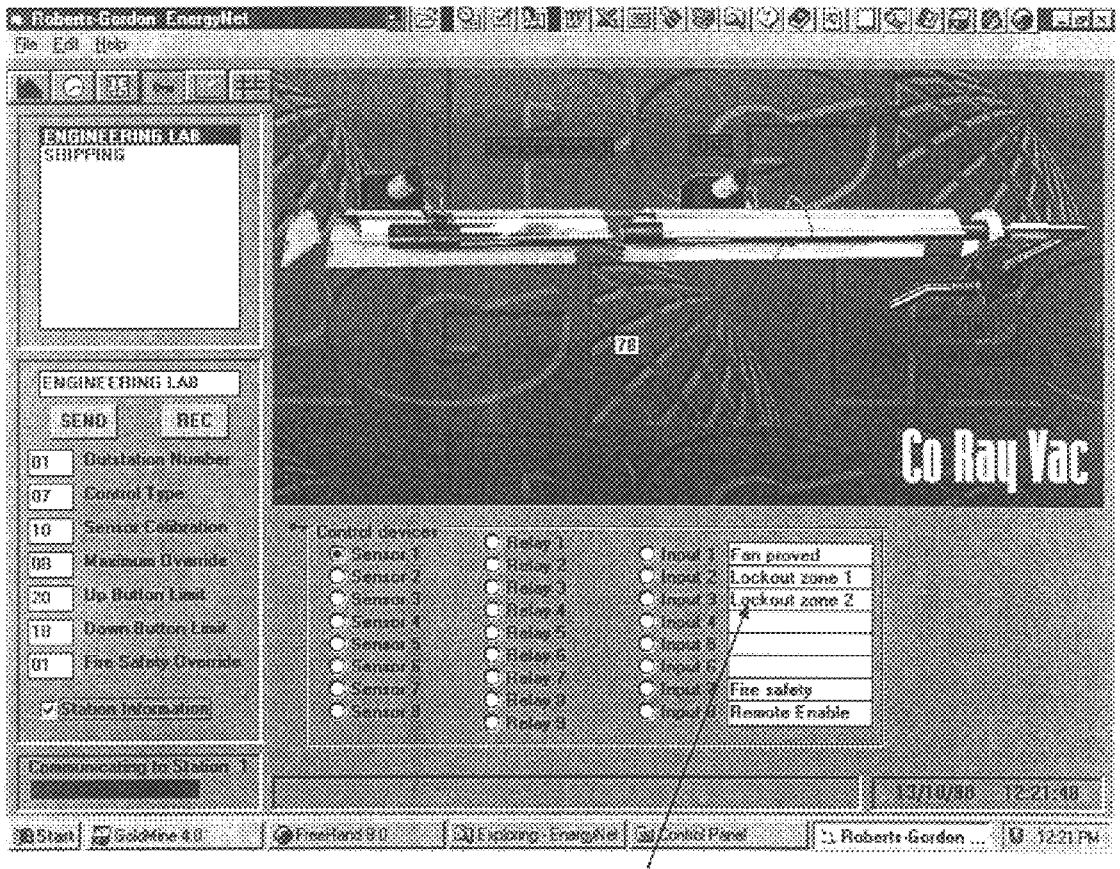

Engineer's Set-up Screen (FIGS. 16 and 17)

The Engineer's Set-up screen shown in FIG. 16 enables the engineer to select and position devices. By selecting the zone and highlighting the device it is possible to position the device where it will be when the time screen is displayed. The screen shown in FIG. 16 illustrates how the screen would appear if the layout display method is selected. The screen shown in FIG. 17 illustrates how the screen would appear if the layout display method is not selected.

Figure 18:
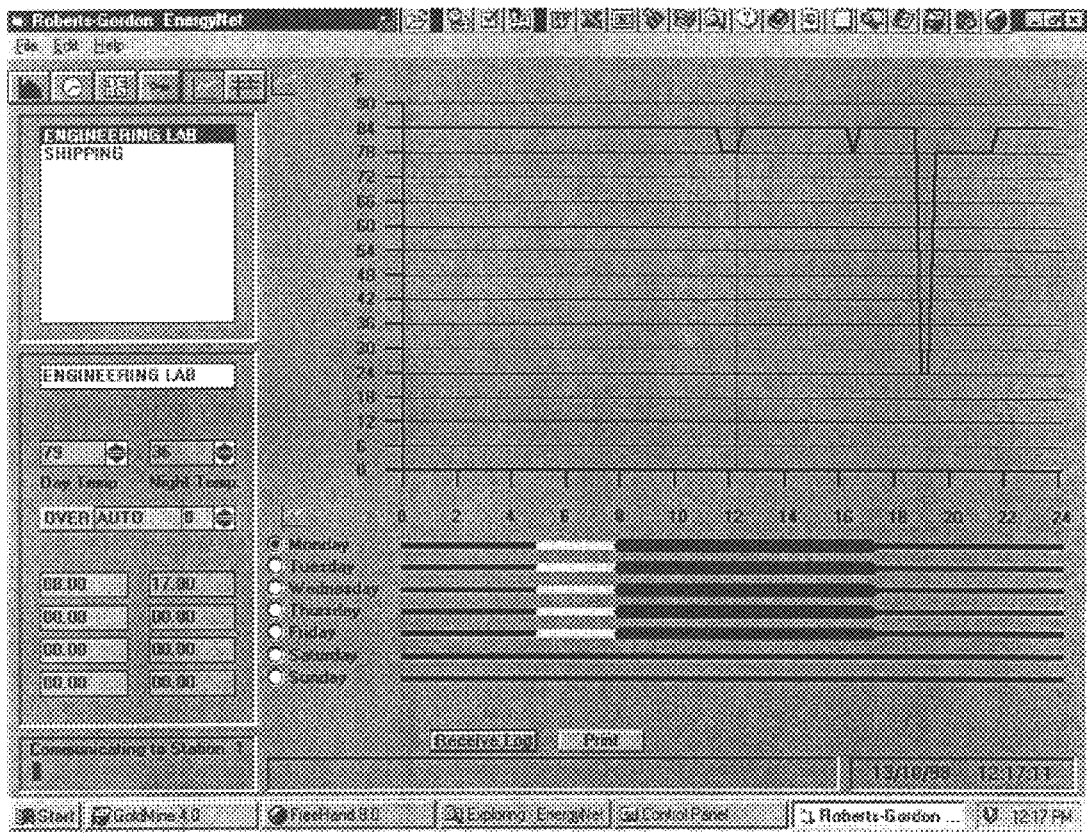
FIG. 18 is a screen capture of the temperatures sensed screen of the computer program of the invention.

Temperatures Sensed Screen (FIG. 18)

The temperatures sensed screen shown in FIG. 18 enables the user to display and print the temperatures sensed in each zone for the previous 24 hours.

Figure 19:
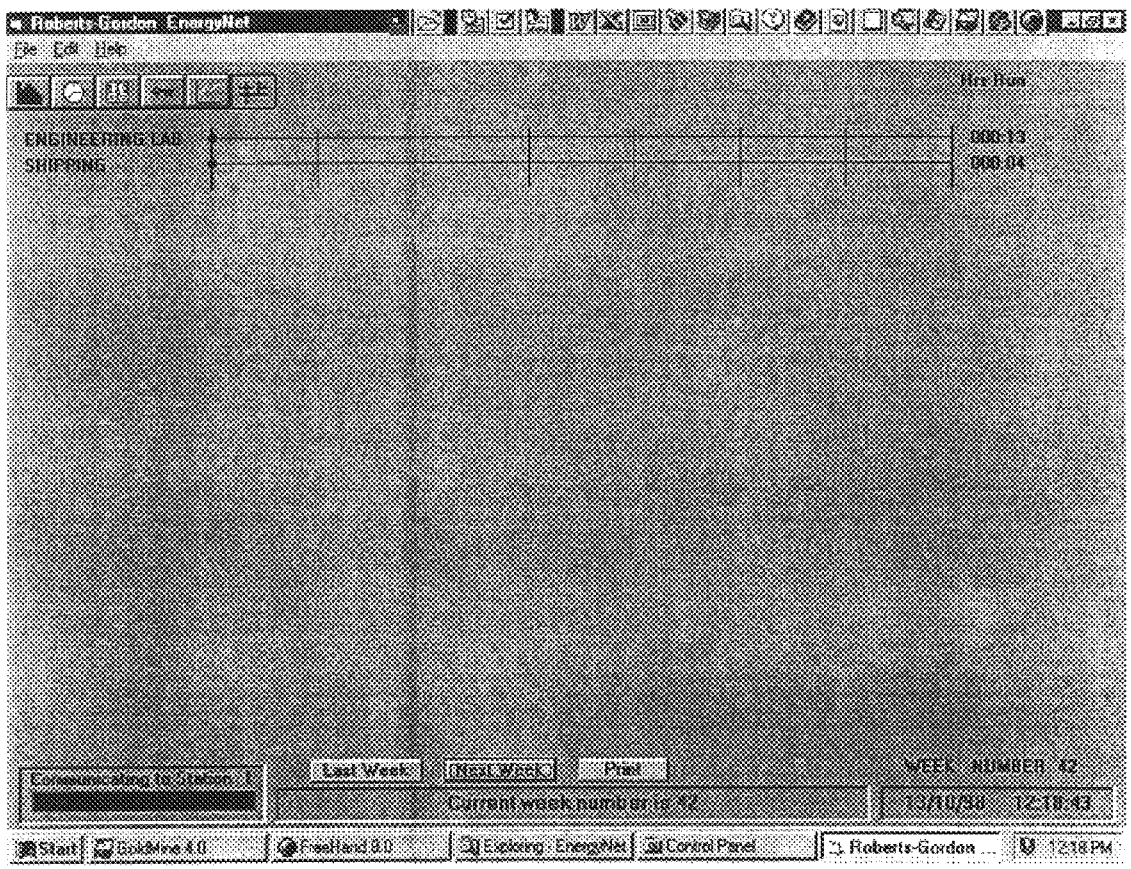
FIG. 19 is an hours run screen of the computer program of the invention.

Hours Run Screen (FIG. 19)

The temperatures sensed screen shown in FIG. 19 enables the user to display and print the hours run and the power input for each zone per week for 4 weeks. The power figure for each zone is set in the engineers set up screen. The numbers for hours run and power input assume that the burners work—it does not account for any lockout condition or gas failure, etc.

We now describe the actual programming of a BZC 700 model controller such that it will control a plurality of radiant sub-systems. The figures described herein are screen displays that appear to assist the programmer when making selections. Each selection causes the microprocessor in the controller to operate the relays and inputs within the controller in the manner of the pre-programmed sub routines required for each different radiant heating sub-system type.

Figure 20:
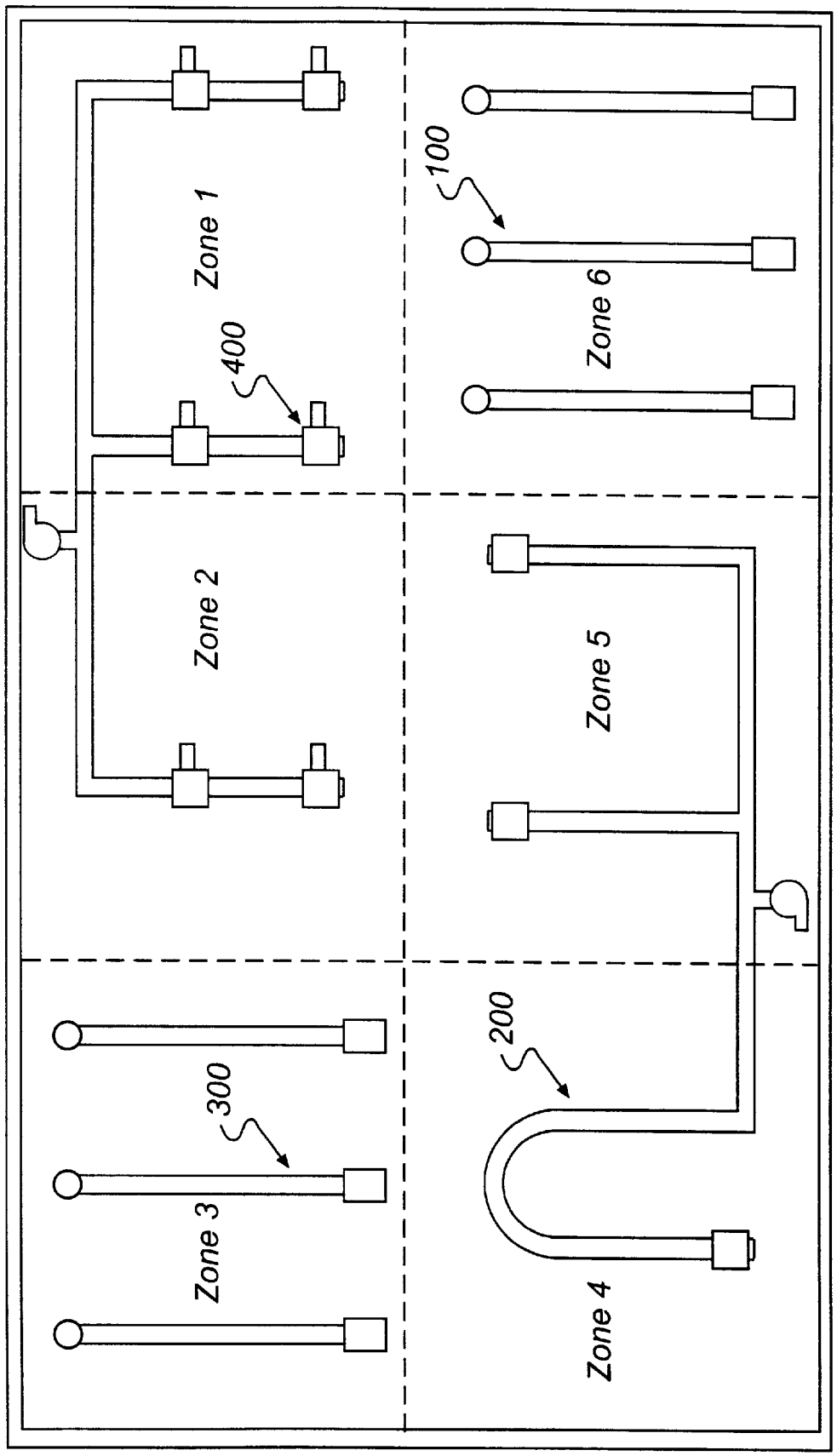
FIG. 20 is a schematic diagram illustrating various types of radiant energy heating sub-systems located within various zones within a building.

The set up described herein is for a representative configuration for six zones within a building as shown schematically in FIG. 20, where the first two zones are each heated by fourth type CoRayVac® sub-systems operating on a common vacuum pump; the third zone is heated by a third type Gordon Ray®DF sub-system (having outputs for high and low fire); the fourth and fifth zones are each heated by second type Vantage®EV sub-system operating from a common fan; and the sixth zone is heated by first type Gordon Ray®BH sub-system. This configuration activates a reserved input for fire safety shut off, resulting in heater lockout indication being available on inputs 2 through 6.

Figure 21:
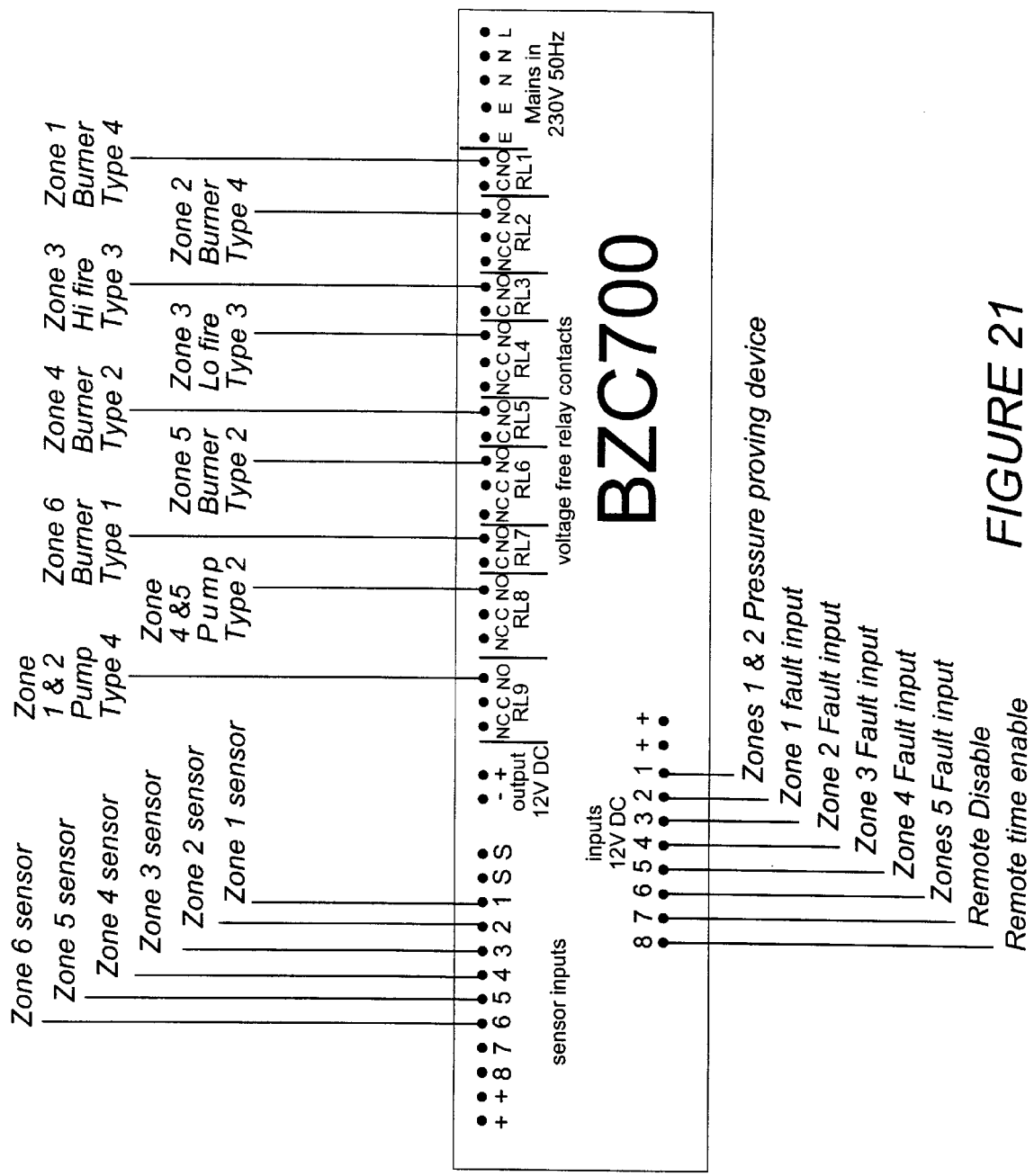
FIG. 21 is an electronic schematic diagram illustrating interconnections between the controller within the control panel and the various types of radiant energy heating sub-systems located within various zones within a building; and, FIGS. 22 to 38 illustrate the control displays through a representative programming sequence of various types of radiant energy heating sub-systems located within various zones within a building.

Before explaining the programming of a control panel for the building heating system shown in FIG. 20, FIG. 21 illustrates an electrical schematic diagram which shows the designations and interconnections to the plurality of sub-systems within the building which occurs as a result of the programmed routine described as follows:

FIGS. 22–38 are illustrations of the control panel display screens. What follows is a description of how one would program the controller for a particular application.

Figure 22:
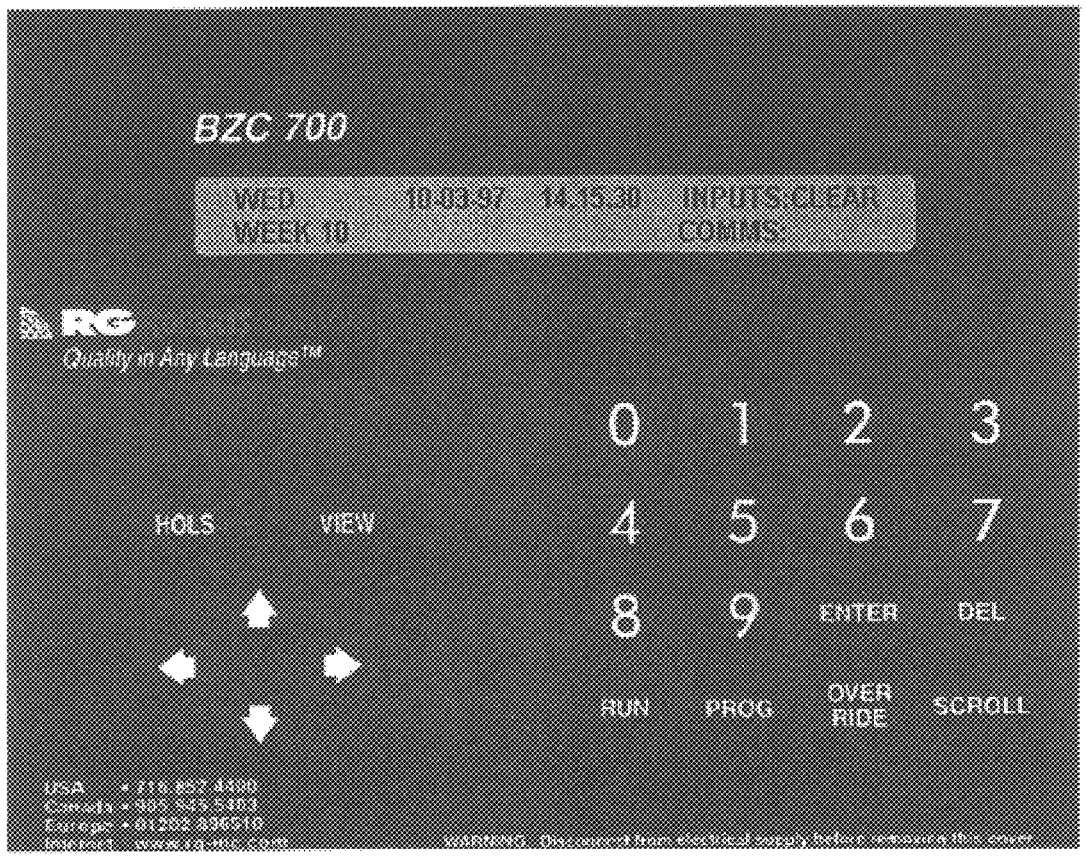

Adverting first to FIG. 22, the display shows the normal running status screen. To enter the BZC program one first presses the PROG button, which results in the display changing to that shown in FIG. 23.

Figure 23:
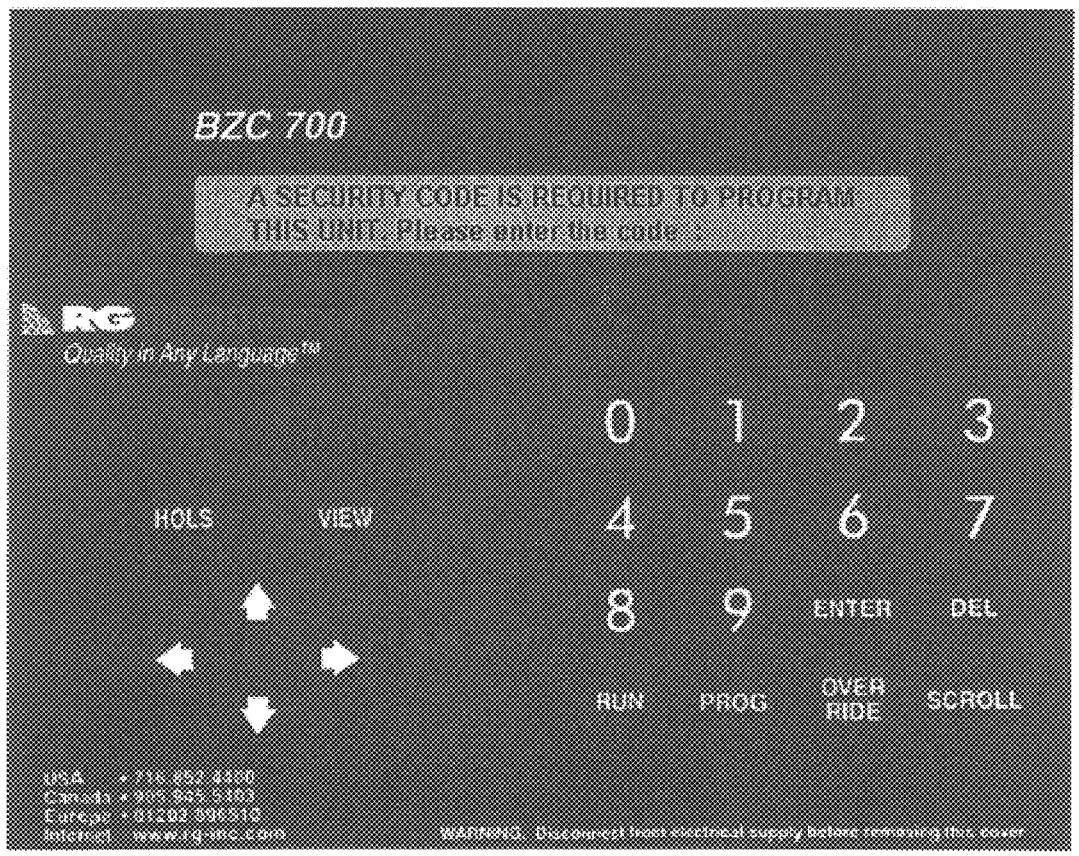

Adverting now to FIG. 23, the user is now able to enter 3 codes to enter various levels of programming. For the purpose of configuration the user enters the Clear Data Level Section, the code of which is set to PROG 109. The code is entered through the keypad.

Figure 24:
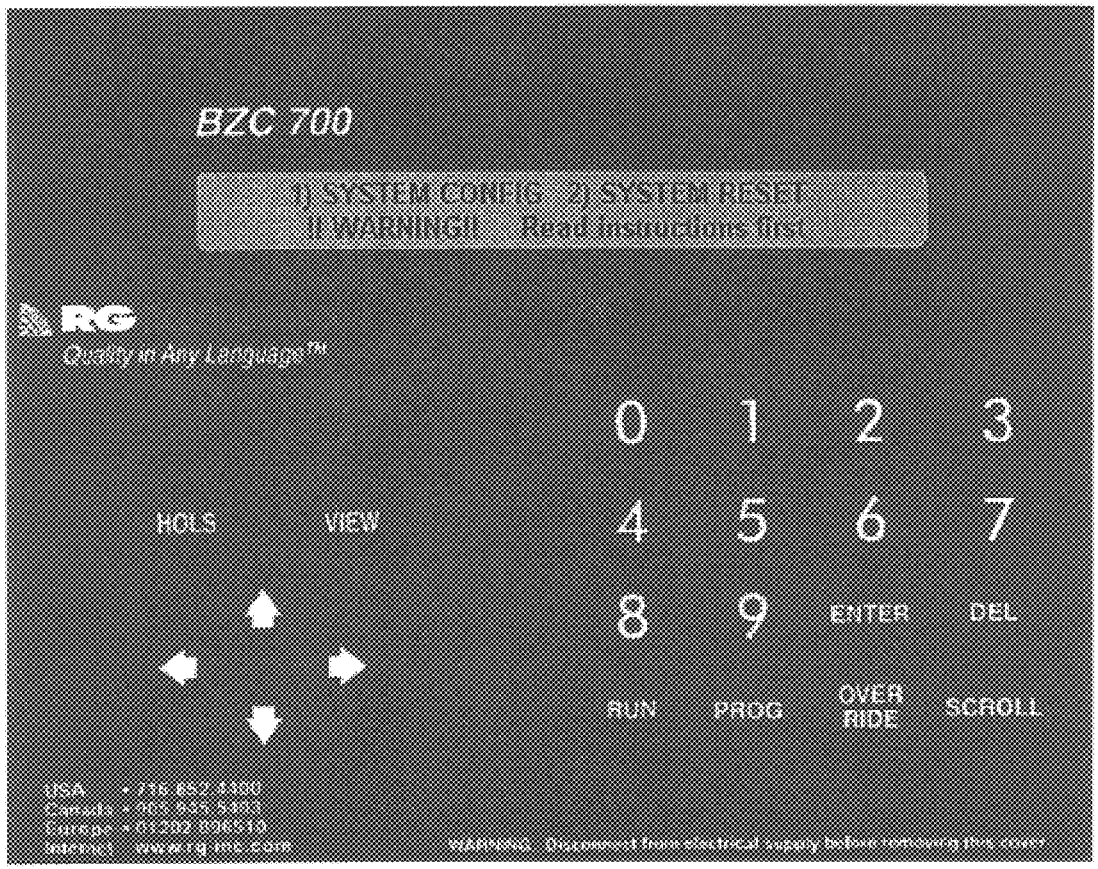

As shown in FIG. 24, to configure the BZC controller, press 1 for SYSTEM CONFIG.

Figure 25:
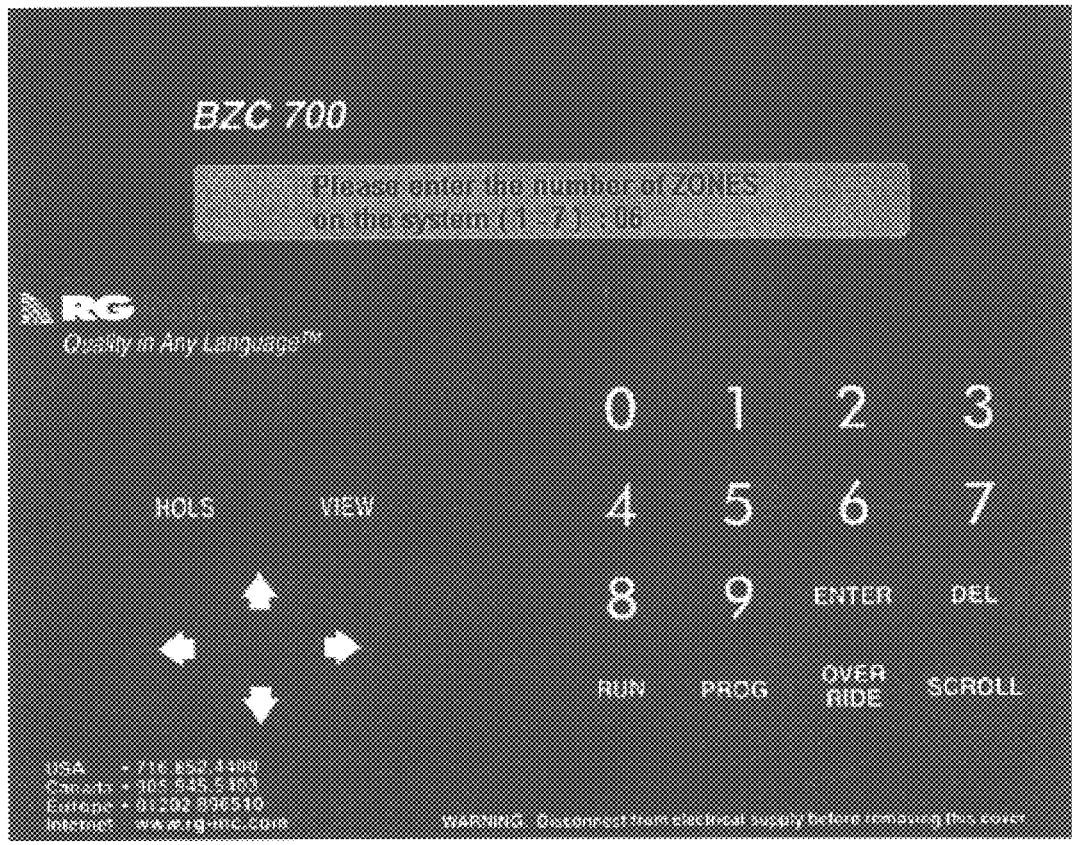

As shown in FIG. 25, the user is now prompted to enter the number of zones on the system. For the configuration described above, the user types 06 for 6 zones.

Figure 26:
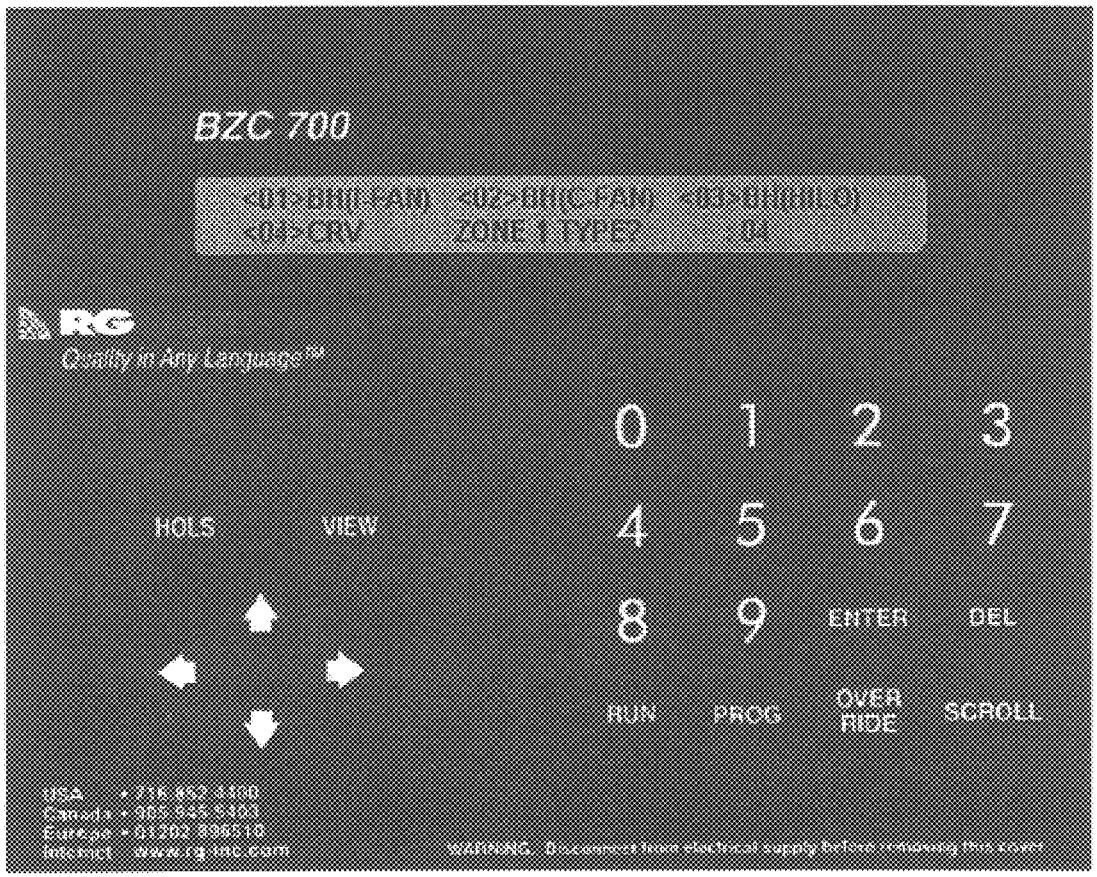

As shown in FIG. 26, the user is now prompted for the heater type for zone 1. For the configuration described above, the user types 04 for the fourth type (abbreviated to CRV). By entering the sub-system type the preprogrammed routine now assigns the first relay on the board to be the zone 1 burner output and prompts the user to select the pump output it will work with.

Figure 27:
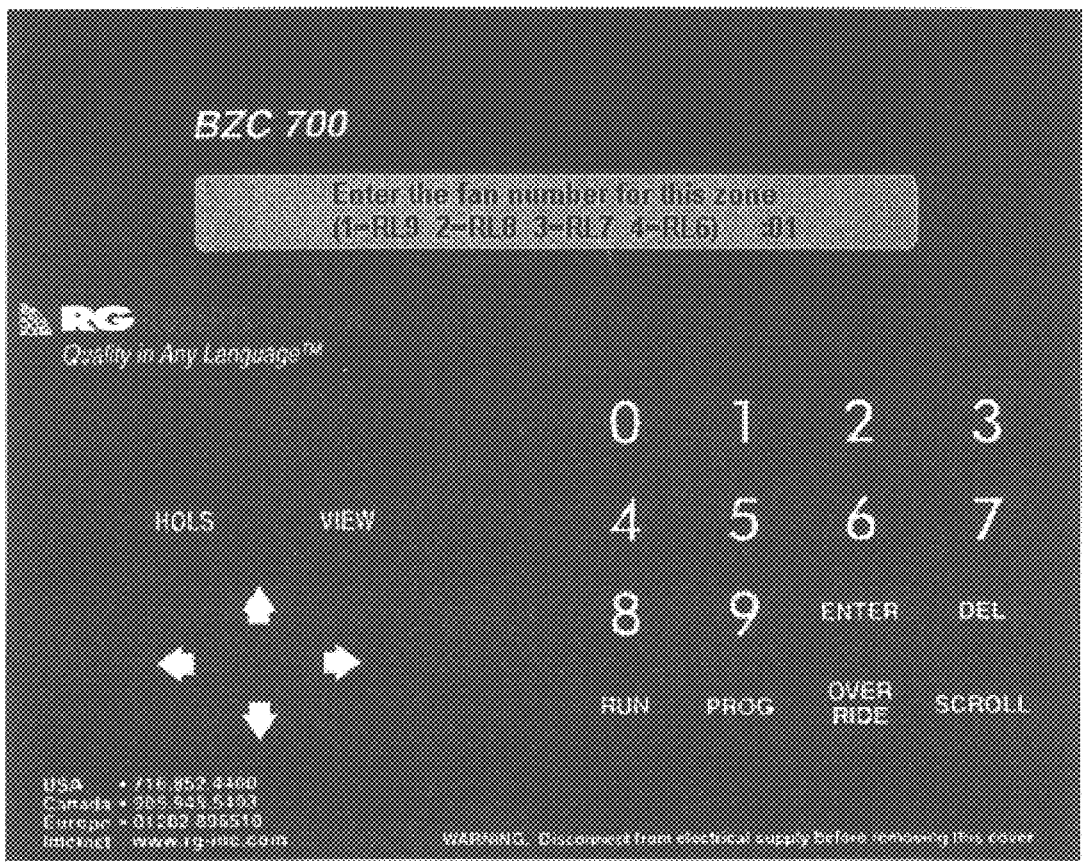

As shown in FIG. 27, the user is now prompted for the fan number for zone 1. The default prompt for the first zone is 01 for relay number 9 on the board. Further, because the sub-system type is CoRayVac® the program assigns input 1 for the pressure switch input.

Figure 28:
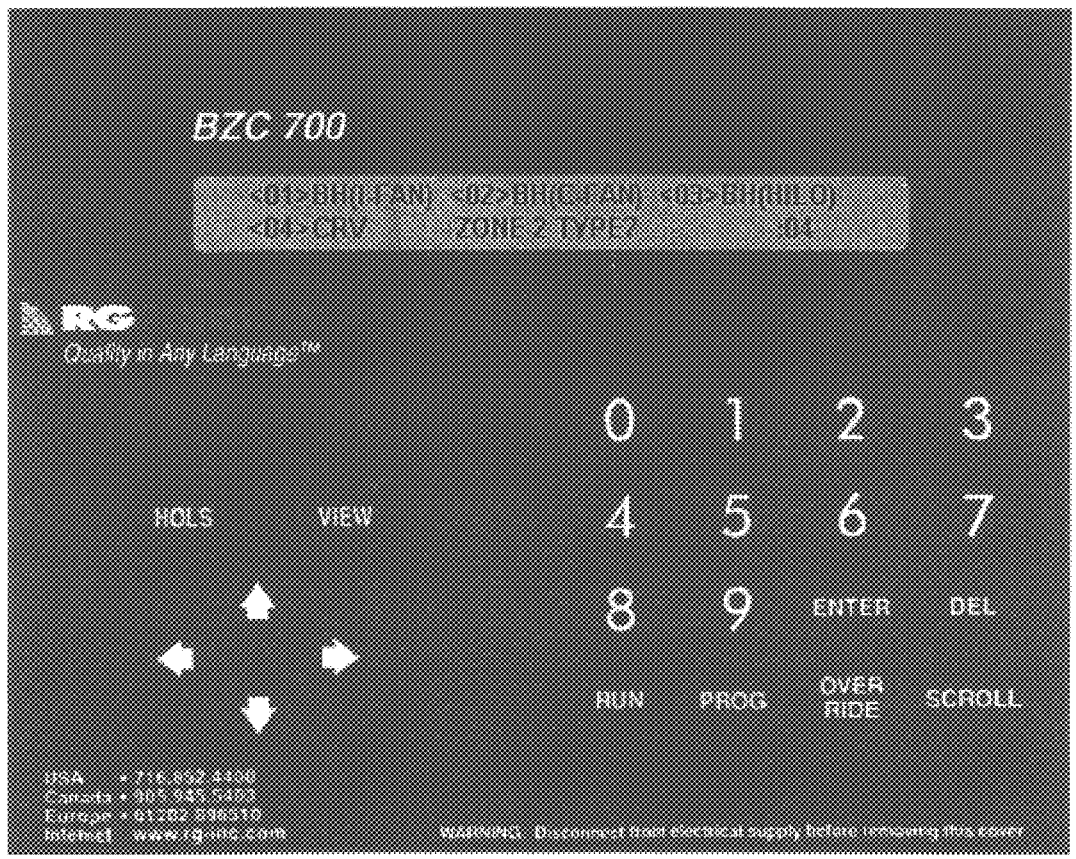

As shown in FIG. 28, the user is now prompted for the heater type for zone 2. For this configuration, the user types 04 for CRV (Co-RayVac®). By entering the sub-system type the preprogrammed routine now assigns the second relay on the board to be the zone 2 burner output and prompts the user to select the pump output it will work with.

Figure 29:
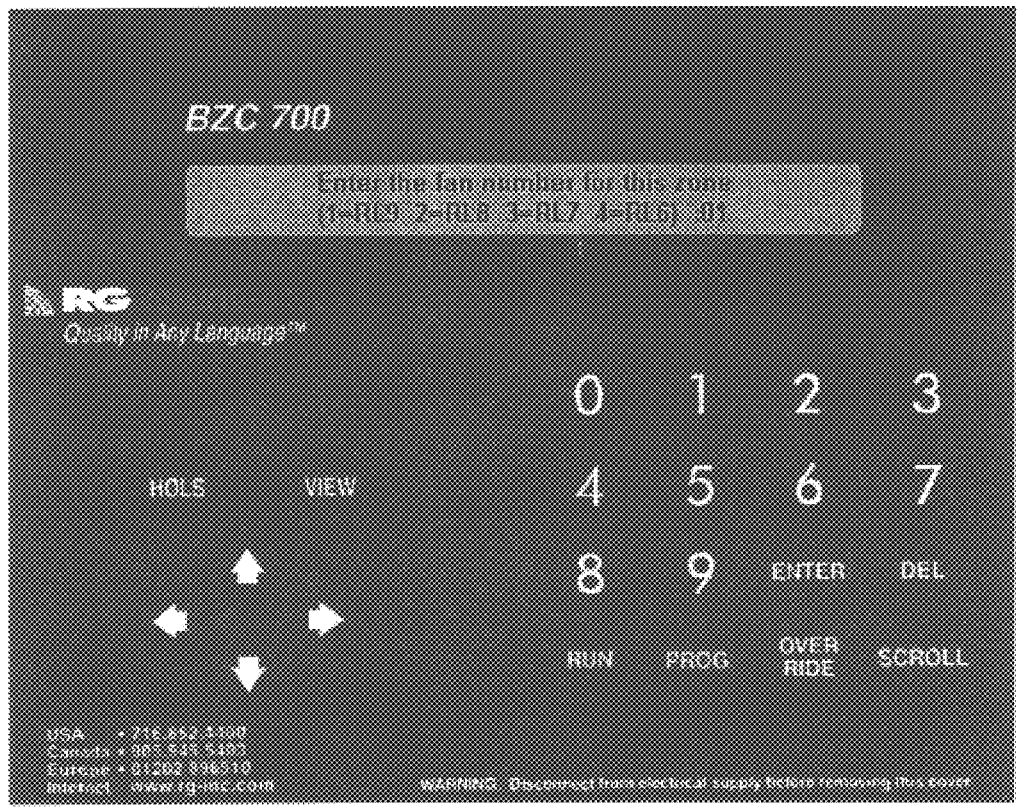

As shown in FIG. 29, the user is now prompted for the fan number for zone 2. The default value would be 02 but because zone 1 and zone 2 are operating from a common vacuum pump, the user types 01 for number 1. The selection of 01 causes the program to assign the same input 1 for the fan proving pressure switch for zones 1 and 2.

Figure 30:
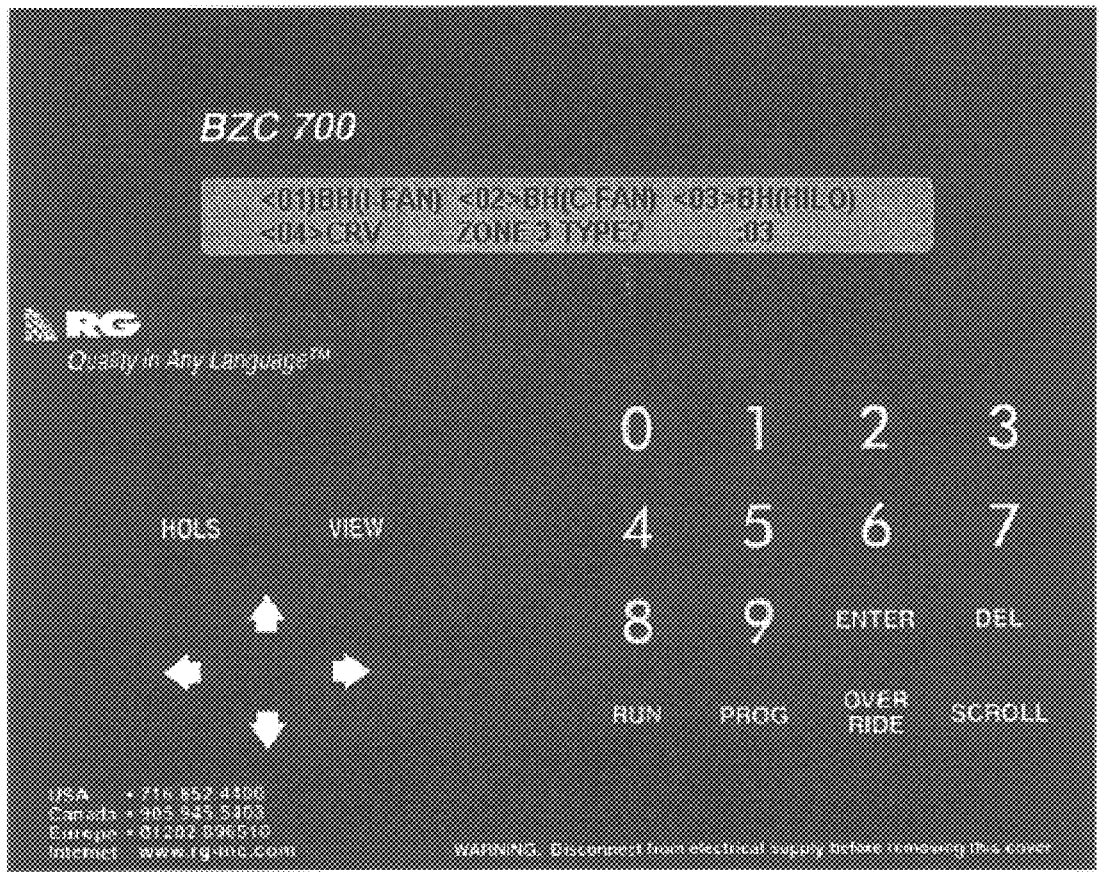

As shown in FIG. 30, the user is now prompted for the heater type for zone 3. For this example configuration, the user types 03 for BH(Hilo). By entering the sub-system type the preprogrammed routine now assigns the third and fourth relay on the board to be the zone 3 burner output, where the third output will be low fire and the fourth output will be high fire. There will also be an extra screen for this zone under the engineer's set-up where the engineer can define the differential temperature for the operation of these relays.

Figure 31:
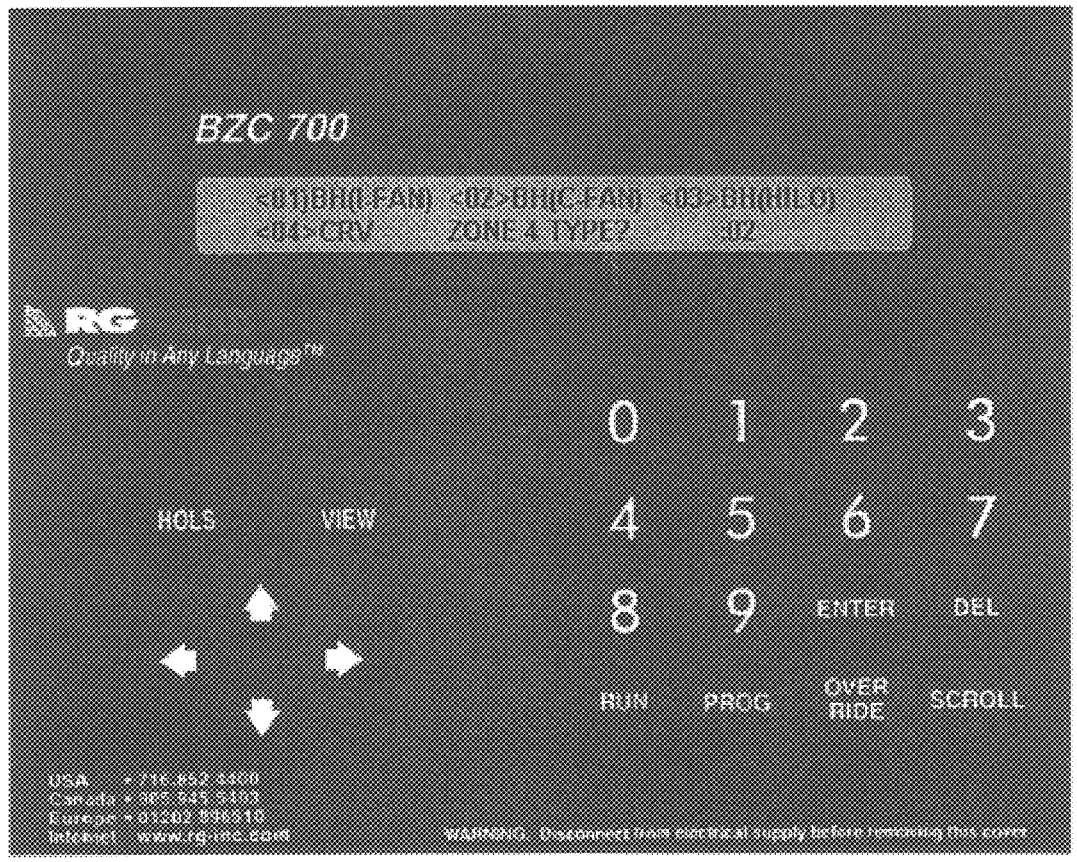

As shown in FIG. 31, the user is now prompted for the heater type for zone 4. For this example configuration, the user types 02 for BH(Common-Fan). By entering the sub-system type the preprogrammed routine now assigns the fifth relay on the board to be the zone 4 burner output and prompts the user to select the pump output it will work with.

Figure 32:
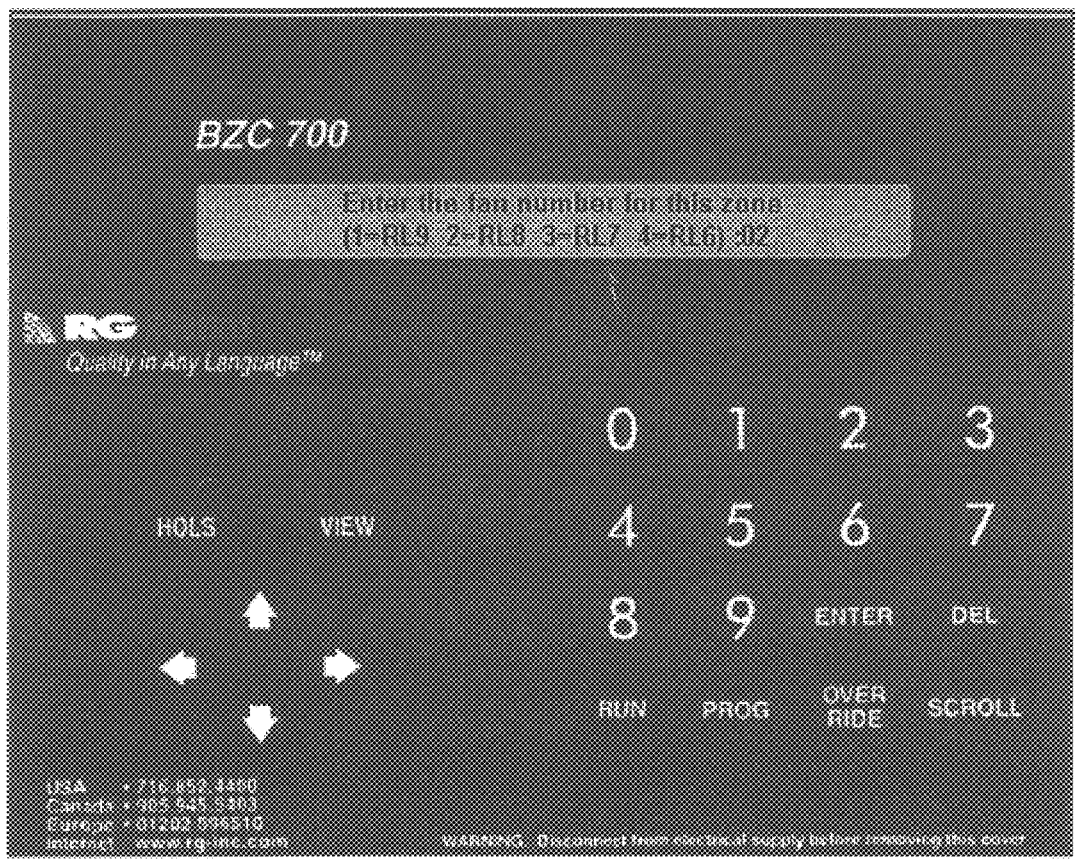

As shown in FIG. 32, the user is now prompted for the fan number for zone 4. The default value is 02 for relay number 8. Because this sub-system is a multiburner radiant heating system the program does not automatically assign an input for the vacuum proving pressure switch because it is not required.

Figure 33:
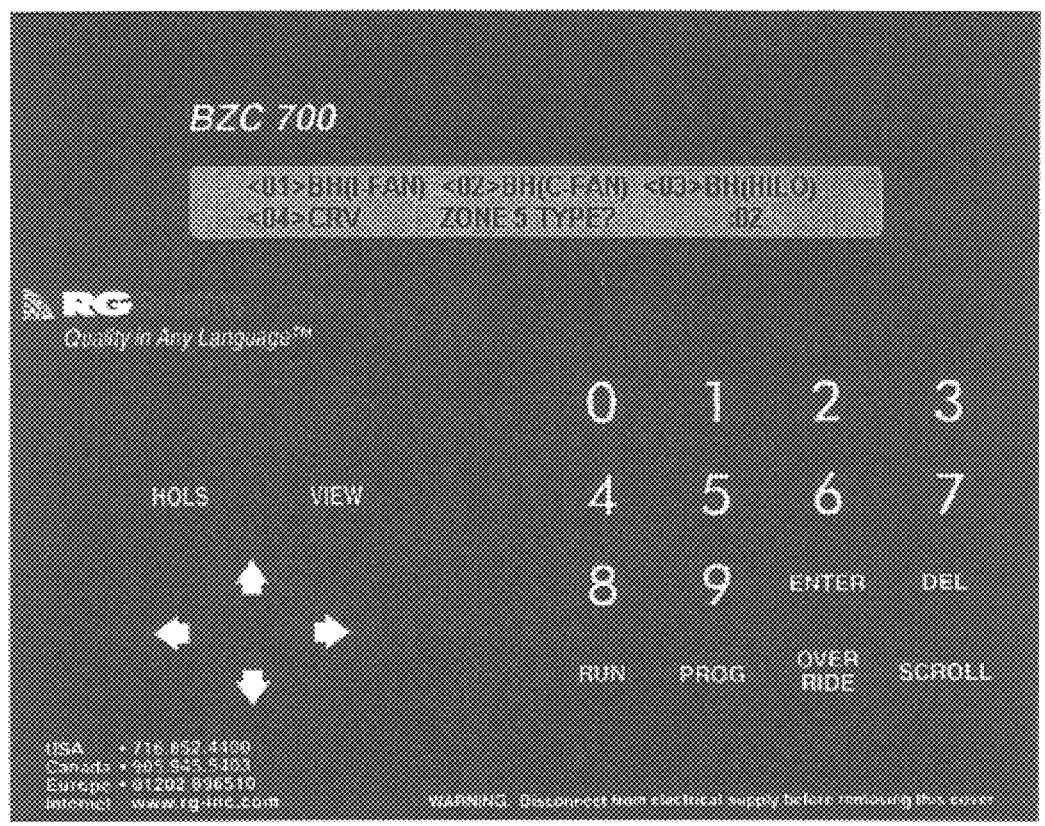

As shown in FIG. 33, the user is now prompted for the heater type for zone 5. For this configuration, the user types 02 for Type 2 BH(Common-Fan). By entering the sub-system type the preprogrammed routine now assigns the sixth relay on the board to be the zone 5 burner output and prompts the user to select the pump output it will work with.

Figure 34:
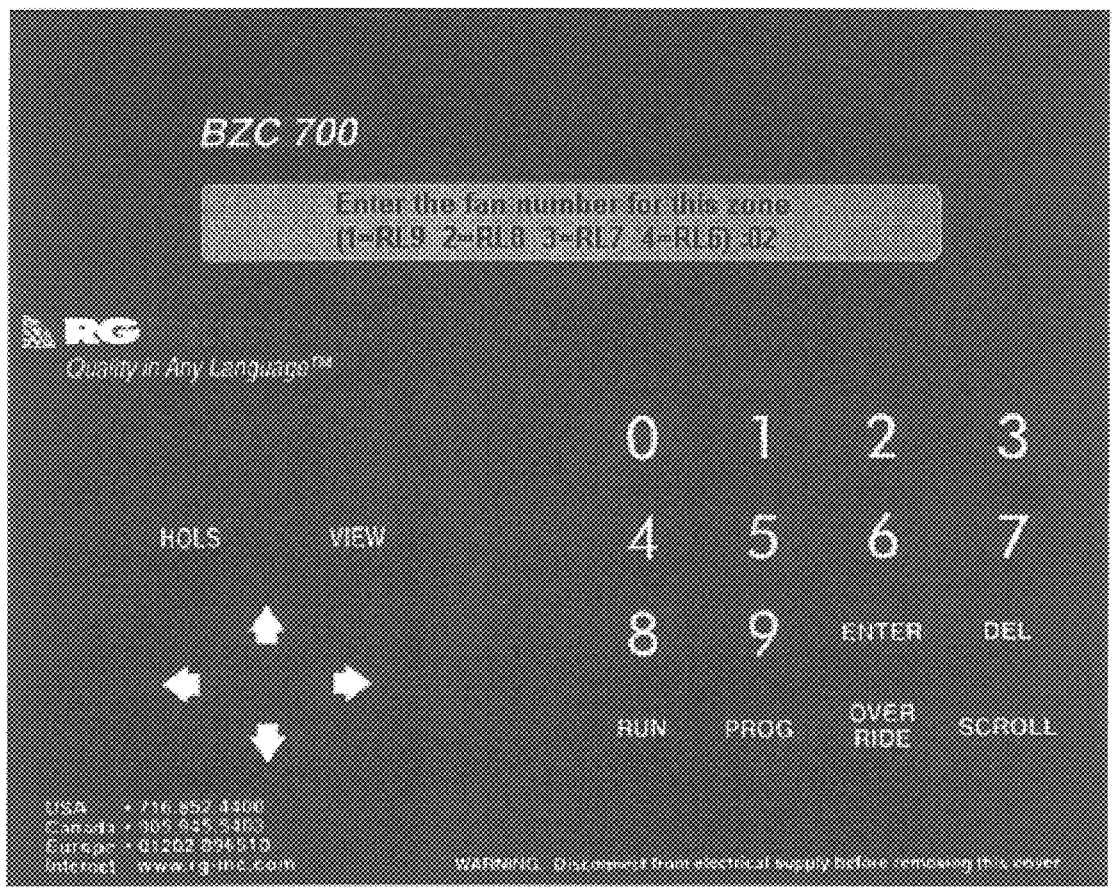

As shown in FIG. 34, the user is now prompted for the fan number for zone 5. The default value is 03 for relay number 7. Zone 5, however, shares the vacuum pump with zone 4 and therefore the user should select 02 for relay number 8. This selection sets up a routine whereby if zone 4 is operating and zone 5 calls for heat the burner in zone 4 and the vacuum pump will switch off and after a period of 30 seconds switch on zones 4, 5 and the vacuum pump. This facility allows the pressure switches in the burners in zone 5 to reset before the start up sequence.

Figure 35:
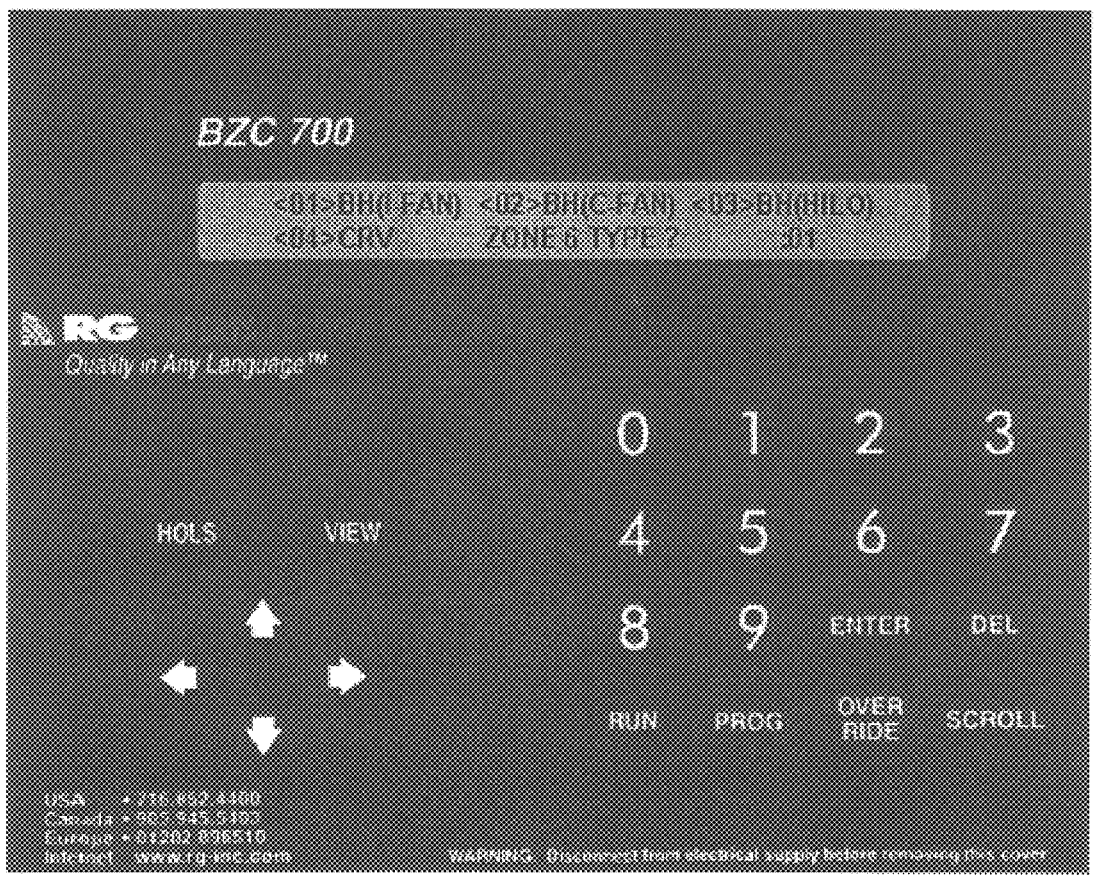

As shown in FIG. 35, the user is now prompted for the heater type for zone 6. For this configuration, the user types 01 for First Type BH(Individual-Fan). By entering the sub-system type the preprogrammed routine now assigns the seventh relay on the board to be the zone 6-burner output. This completes the selection of zone and pump outputs for this configuration.

Figure 36:
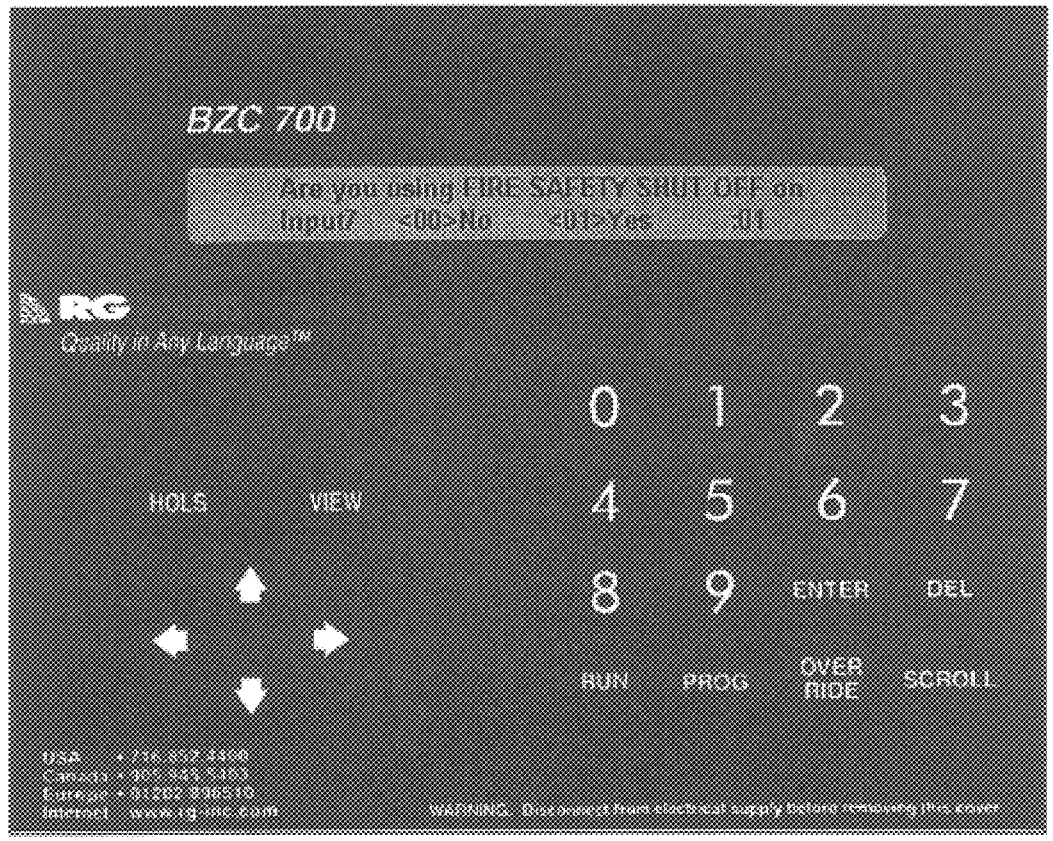

As shown in FIG. 36, the user is now asked if he wishes to use the Fire Safety facility. For this example configuration, the user types 01 for yes. This will automatically assign the reserved input number 7 for disabling the controls outputs when activated.

Figure 37:
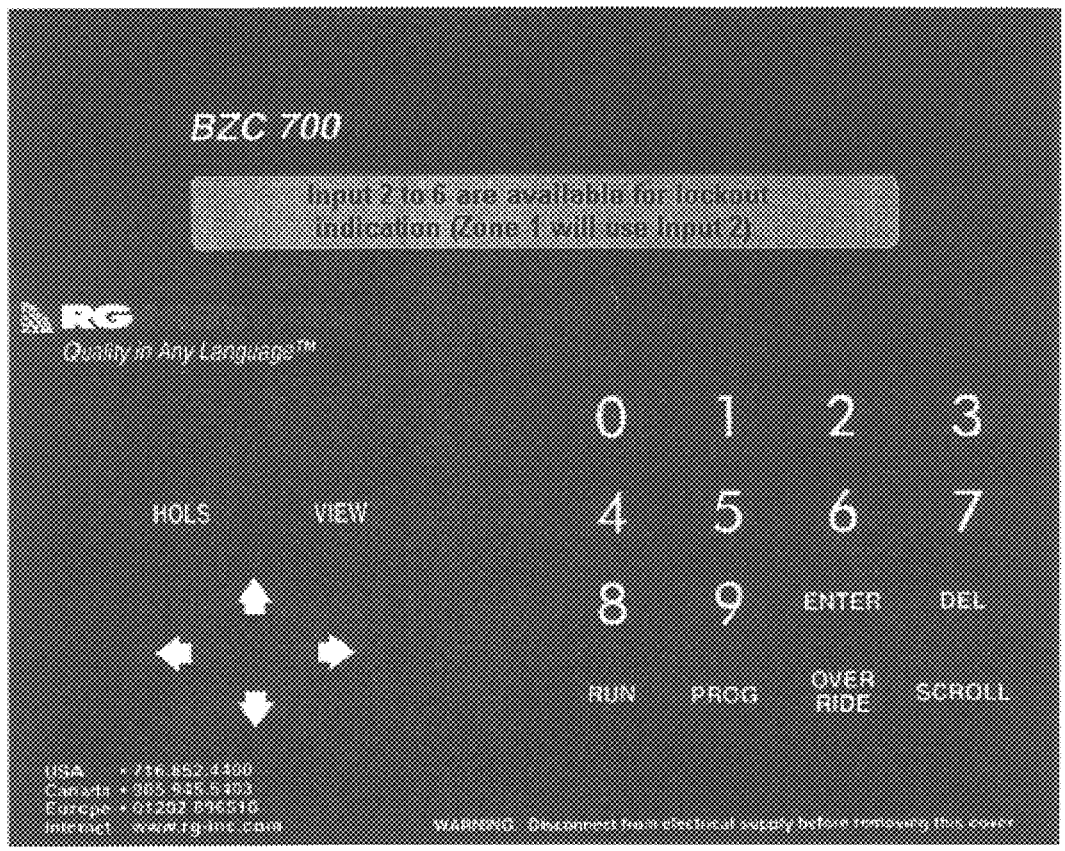

As shown in FIG. 37, the display now shows that because input 1 has been defined for the pressure switch input for zones 1 and 2, input 7 has been reserved for remote disable and input 8 is reserved on all controls for remote enable, the inputs 2 through 6 are available for the activation of burner or pump fault indication where zone 1 will use input 2.

Figure 38:
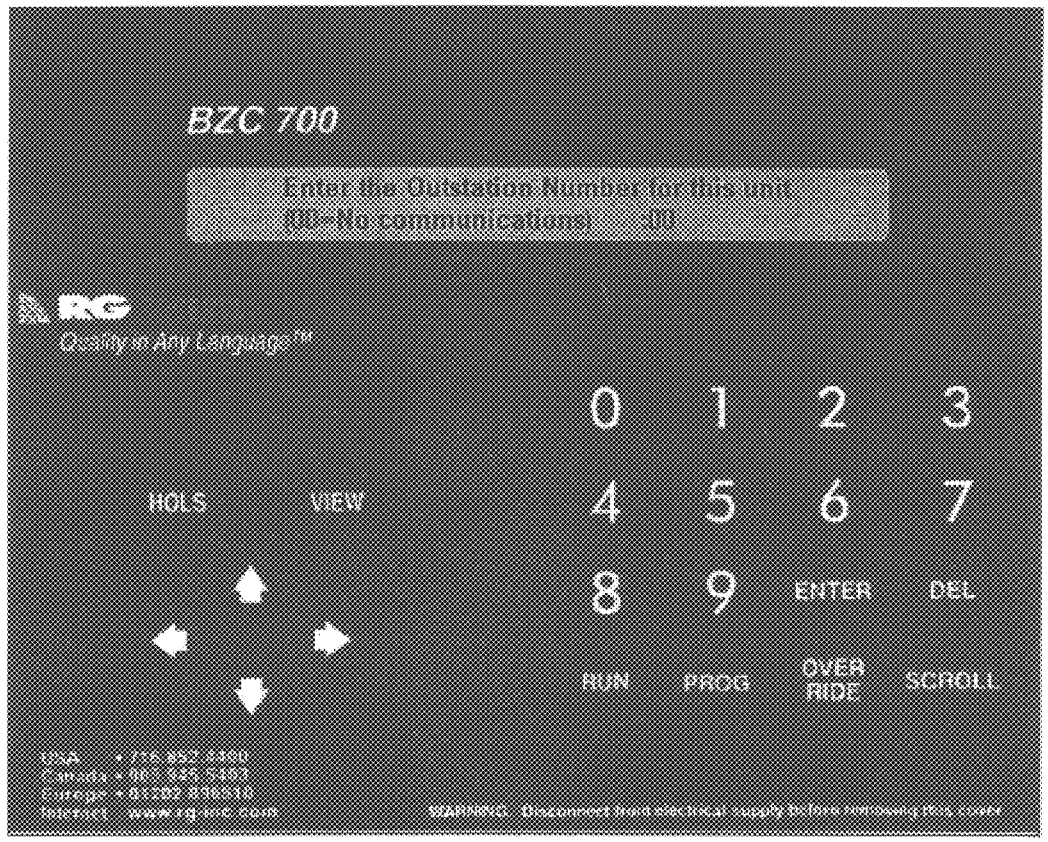

As shown in FIG. 38, this control is not being configured for use with a PC and therefore 00 is entered for no communication. If the control was for use with a PC the outstation number for communication identification would be entered here.

Thus, it is seen that the objects of the invention are efficiently obtained. It will be appreciated by those having ordinary skill in the art that improvements and modifications can be made in the invention without departing from the spirit and scope of the appended claims.

What we claim is:

1. A control system for a radiant energy heating system, wherein said radiant energy heating system includes at least two different types of radiant heating sub-systems, wherein a first type of said sub-systems comprises a unitary system having a first gas burner operatively arranged to ignite gas within a first radiant tube, and a reflector operatively arranged to reflect energy emitted by said first radiant tube, and a first means for exhausting said first gas burner's products of combustion, said first type of sub-system operatively arranged to heat a corresponding zone in a facility, said control system comprising a solid state electronic control panel that is pre-programmed to control at least two of said at least two different types of radiant heating sub-systems, wherein said control panel actually controls at least one of said at least two different types of radiant heating sub-systems.

2. A radiant energy control system as recited in claim 1 wherein said means for exhausting comprises a vacuum pump.

3. A radiant energy control system as recited in claim 1 wherein said means for exhausting comprises a blower.

4. A radiant energy control system as recited in claim 1 wherein each of said types of radiant energy heating sub-systems is located in a corresponding zone in a facility, and said control system further includes an ambient air temperature sensor in each corresponding zone, wherein said ambient air temperature sensor measures ambient air temperature in said corresponding zone and communicates said measured temperature to said control system.

5. A radiant energy control system as recited in claim 1 wherein each of said types of radiant energy heating subsystems is located in a corresponding zone in a facility, and said control system further includes a mean radiant temperature sensor in each said corresponding zone, wherein said sensor measures mean radiant temperature in said corresponding zone and communicates said measured mean radiant temperature to said control system.

6. A radiant energy control system as recited in claim 1 wherein said control panel includes an input reserved to disable all sub-systems.

7. A radiant energy control system as recited in claim 1 wherein said control panel includes an input reserved for enabling all sub-systems to be overridden by an external control system.

8. A radiant energy control system as recited in claim 1 wherein said control system is operatively arranged to interface with a remote overload protection device, wherein said control panel includes an input available to receive and display fault information at said control panel.

9. A radiant energy control system as recited in claim 1 wherein said control system is operatively arranged to automatically assign inputs to detect burner malfunction and display information about said malfunction at said control panel.

10. A radiant energy control system as recited in claim 1 comprising:
one or more solid state control panels, each said control panel pre-programmed to control two or more of said types of radiant heating sub-systems, wherein said control panel controls one or more of said types of sub-systems; and,
a personal computer programmed to interface and control one or more of said solid state electronic control panels.

11. The invention as recited in claim 1 operatively arranged to heat a sixth zone within a facility.

12. A control system for a radiant energy heating system, wherein said radiant energy heating system includes at least two different types of radiant heating sub-systems, wherein a second type of said sub-systems comprises a plurality of burners, where each of said burners is operatively arranged to ignite gas within a corresponding tube, and a reflector operatively arranged to reflect energy emitted by said corresponding radiant tube, said second type also comprising a common vacuum pump operatively arranged to draw heat through a plurality of said corresponding radiant tubes and to exhaust products of combustion, said second type of sub-system operatively arranged to heat a corresponding zone in a facility, said control system comprising a solid state electronic control panel that is pre-programmed to control at least two of said at least two different types of radiant heating sub-systems, wherein said control panel actually controls at least one of said at least two different types of radiant heating sub-systems.

13. A radiant energy control system as recited in claim 12 comprising:
one or more solid state control panels, each said control panel pre-programmed to control two or more of said types of radiant heating sub-systems, wherein said control panel controls one or more of said types of sub-systems;
a personal computer programmed to interface and control one or more of said solid state electronic control panels.

14. The invention as recited in claim 12 operatively arranged to heat a fourth and fifth zone within a facility.

15. A control system for a radiant energy heating system, wherein said radiant energy heating system includes at least two different types of radiant heating sub-systems, wherein a third type of said sub-systems comprises a unitary system having a third dual-stage gas burner operatively arranged to reflect energy emitted by said third radiant tube, and a reflector operatively arranged to reflect energy emitted by said third radiant tube, and a third means for exhausting said third gas burner's products of combustion, said third type of sub-system operatively arranged to heat a corresponding zone in a facility, said control system comprising a solid state electronic control panel that is pre-programmed to control at least two of said at least two different types of radiant heating sub-systems, wherein said control panel actually controls at least one of said at least two different types of radiant heating sub-systems.

16. A radiant energy control system as recited in claim 15 wherein said means for exhausting comprises a vacuum pump.

17. A radiant energy control system as recited in claim 15 wherein said means for exhausting comprises a blower.

18. A radiant energy control system as recited in claim 15 comprising:
one or more solid state control panels, each said control panel pre-programmed to control two or more of said types of radiant heating sub-systems, wherein said control panel controls one or more of said types of sub-systems; and,
a personal computer programmed to interface and control one or more of said solid state electronic control panels.

19. The invention as recited in claim 15 operatively arranged to heat a third zone within a facility.

20. A control system for a radiant energy heating system, wherein said radiant energy heating system includes at least two different types of radiant heating sub-systems, wherein a fourth type of said sub-systems comprises a system having plurality of burners operatively arranged in series to ignite gas within a fourth radiant tube, which plurality of burners are also arranged to fire simultaneously, and a reflector operatively arranged to reflect energy emitted by said fourth radiant tube, a fourth vacuum pump operatively arranged to draw heat through said fourth radiant tube, and a pressure proving device operatively arranged to prove pressure within said fourth radiant tube, said fourth type of sub-system arranged to heat a corresponding zone within a facility, said control system comprising a solid state electronic control panel that is pre-programmed to control at least two of said at least two different types of radiant heating sub-systems, wherein said control panel actually controls at least one of said at least two different types of radiant heating sub-systems.

21. A radiant energy control system as recited in claim 20 comprising:
one or more solid state control panels, each said control panel pre-programmed to control two or more of said types of radiant heating sub-systems, wherein said control panel controls one or more of said types of sub-systems; and,
a personal computer programmed to interface and control one or more of said solid state electronic control panels.

22. The invention as recited in claim 20 operatively arranged to heat a first and second zone within a facility.

23. A control system for a radiant energy heating system, wherein said radiant energy heating system includes at least two different types of radiant heating sub-systems, wherein a fifth type of said sub-systems comprises a system having plurality of burners operatively arranged in series to ignite gas within a fifth radiant tube, which plurality of burners are also arranged to fire simultaneously, and a reflector operatively arranged to reflect energy emitted by said fifth radiant tube, a fifth vacuum pump driven by a variable frequency motor operatively arranged to draw heat through said fifth radiant tube, and a pressure proving device operatively arranged to prove pressure within said fifth radiant tube, said fifth type of sub-system arranged to heat a corresponding zone within a facility, said control system comprising a solid state electronic control panel that is pre-programmed to control at least two of said at least two different types of radiant heating sub-systems, wherein said control panel actually controls at least one of said at least two different types of radiant heating sub-systems.

24. A radiant energy control system as recited in claim 23 comprising:
- one or more solid state control panels, each said control panel pre-programmed to control two or more of said types of radiant heating sub-systems, wherein said control panel controls one or more of said types of sub-systems; and,
- a personal computer programmed to interface and control one or more of said solid state electronic control panels.

25. The invention as recited in claim 23 operatively arranged to heat a seventh zone within a facility.

26. A method of controlling a radiant energy heating system, wherein said radiant energy heating system includes at least two different types of radiant heating sub-systems, wherein a first type of radiant energy sub-systems comprises a unitary system having a first gas burner operatively arranged to ignite gas within a first tube, and a reflector operatively arranged to reflect energy emitted by said first radiant tube, and a first means for exhausting said first gas burner's products of combustion, said first type of sub-system operatively arranged to heat a zone in a facility, said method comprising:
- controlling said first type of said at least two different types of radiant heating sub-systems with a solid state electronic control panel which is pre-programmed to control said first of said at least two different types of radiant heating sub-systems according to a first control program; and
- controlling a second type of said at least two different types of radiant heating sub-systems with a solid state electronic control panel which is pre-programmed to control said first of said at least two different types of radiant heating sub-systems according to a first control program, wherein said first and second types of said at least two different types of radiant heating sub-systems are different types of radiant heating sub-systems; said method further comprising:
  - sensing a demand for heat within a sixth zone;
  - activating said first gas burner and said means for exhausting;
  - measuring temperature within said sixth zone; and,
  - deactivating said first burner and said means for exhausting when the measured temperature within said sixth zone reaches a predetermined temperature.

27. A method of controlling one or more types of radiant energy heating sub-systems in a radiant energy heating system as recited in claim 26 and further comprising the step of preventing a subsequent activation of said first gas burner for a predetermined amount of time.

28. The method of controlling one or more types of radiant energy heating sub-system in a radiant energy heating system as recited in claim 26, further comprising the step of controlling one or more of said solid state electronic control panels with a personal computer programmed to interface and control said control panels.

29. A method of controlling a radiant energy heating system, wherein said radiant energy heating system includes at least two different types of radiant heating sub-systems, wherein said radiant energy heating system comprises at least two burners operatively arranged to heat a particular zone in a facility, wherein said at least two burners share a common vacuum pump, said method comprising:
- controlling a first type of said at least two different types of radiant heating sub-systems with a solid state electronic control panel which is pre-programmed to control said first of said at least two different types of radiant heating sub-systems according to a first control program; and,
- controlling a second type of said at least two different types of radiant heating sub-systems with a solid state electronic control panel which is pre-programmed to control said first of said at least two different types of radiant heating sub-systems according to a first control program, wherein said first and second types of said at least two different types of radiant heating sub-systems are different types of radiant heating sub-systems;
- wherein said method further comprises the steps of:
  - sensing a demand for heat within a particular zone;
  - activating one or more burners located within said particular zone where heat is demanded, and also activating said common vacuum pump;
  - measuring temperature within said particular zone where heat is demanded;
  - deactivating all of said one or more burners when the measured temperature within said particular zone reaches a predetermined temperature; and,
  - deactivating said common vacuum pump after a predetermined amount of time has elapsed after deactivation of all of said one or more burners.

30. A method of controlling one or more types of radiant energy heating sub-systems in a radiant energy heating system as recited in claim 29 and further comprising the step of preventing a subsequent activation of said one or more burners for a predetermined amount of time.

31. The method of controlling one or more types of radiant energy heating sub-system in a radiant energy heating system as recited in claim 29, further comprising the step of controlling one or more of said solid state electronic control panels with a personal computer programmed to interface and control said control panels.

32. A method of controlling a radiant energy heating system, wherein said radiant energy heating system includes at least two different types of radiant heating sub-systems, wherein said radiant energy heating system comprises at least two burners, wherein at least one burner is operatively arranged to heat a first zone in a facility, and at least one burner is operatively arranged to heat a second zone in a facility; and wherein all of said burners share a common vacuum pump, said method comprising:
- controlling a first type of said at least two different types of radiant heating sub-systems with a solid state electronic control panel which is pre-programmed to control said first of said at least two different types of radiant heating sub-systems according to a first control program; and,
- controlling a second type of said at least two different types of radiant heating sub-systems with a solid state electronic control panel which is pre-programmed to control said first of said at least two different types of radiant heating sub-systems according to a first control program, wherein said first and second types of said at least two different types of radiant heating sub-systems are different types of radiant heating sub-systems;
- wherein said method further comprises the steps of:

sensing a demand for heat within a first zone;
activating said one or more burners located within said first zone when heat is demanded, and also activating said common vacuum pump;
sensing a demand for heat within said second zone;
deactivating said one or more burners of said first zone and deactivating said common vacuum pump;
after a predetermined period of time, reactivating said common vacuum pump;
activating said one or more burners in both said first and second zones;
measuring temperatures within said first and second zones;
deactivating all of said one or more burners in said first zone when said measured temperature within said first zone reaches a predetermined temperature;
deactivating all of said one or more burners in said second zone when said measured temperature within said second zone reaches a predetermined temperature; and,
deactivating said common vacuum pump after a predetermined time has elapsed after deactivation of all the burners in the first and second zones.

33. A method of controlling one or more types of radiant energy heating sub-systems in a radiant energy heating system as recited in claim 32 and further comprising the step of preventing a subsequent activation of any of said burners for a predetermined amount of time.

34. The method of controlling one or more types of radiant energy heating sub-system in a radiant energy heating system as recited in claim 32, further comprising the step of controlling one or more of said solid state electronic control panels with a personal computer programmed to interface and control said control panels.

35. A method of controlling a radiant energy heating system, wherein said radiant energy heating system includes at least two different types of radiant heating sub-systems, wherein said radiant energy heating system comprises a unitary system having a third dual-stage gas burner operatively arranged to ignite gas within a third radiant tube, and a reflector operatively arranged to reflect energy emitted by said third radiant tube, and a means for exhausting said third gas burners products of combustion; said third type of sub-system operatively arranged to heat a third zone in a facility, said method comprising:
controlling a first type of said at least two different types of radiant heating sub-systems with a solid state electronic control panel which is pre-programmed to control said first of said at least two different types of radiant heating sub-systems according to a first control program; and,
controlling a second type of said at least two different types of radiant heating sub-systems with a solid state electronic control panel which is pre-programmed to control said first of said at least two different types of radiant heating sub-systems according to a first control program, wherein said first and second types of said at least two different types of radiant heating sub-systems are different types of radiant heating sub-systems; wherein said method further comprises the steps of:
sensing a demand for heat within a third zone;
measuring temperature within said third zone;
determining whether said third burner should produce a high flame or a low flame depending upon said measured temperature in the third zone;
activating said third burner with either a high flame or a low flame depending upon said determination, and also activating said third means for exhausting; and,
deactivating said third burner and said means for exhausting when said measured temperature within said third zone reaches a pre-determined temperature.

36. A method of controlling one or more types of radiant energy heating sub-systems in a radiant energy heating system as recited in claim 35 further comprising the step of preventing reactivation of said third burner for a predetermined amount of time after said third burner has been deactivated.

37. The method of controlling one or more types of radiant energy heating sub-system in a radiant energy heating system as recited in claim 35, further comprising the step of controlling one or more of said solid state electronic control panels with a personal computer programmed to interface and control said control panels.

38. A method of controlling a radiant energy heating system, wherein said radiant energy heating system includes at least two different types of radiant heating sub-systems, wherein said radiant energy heating system comprises a plurality of burners operatively arranged in series and a common vacuum pump having a pressure proving device, said pressure proving device being active when a predetermined pressure is measured at a predetermined location within said system indicating it is safe to fire said burners, said system arranged to heat a particular zone in a facility, said method comprising:
controlling a first type of said at least two different types of radiant heating sub-systems with a solid state electronic control panel which is pre-programmed to control said first of said at least two different types of radiant heating sub-systems according to a first control program; and,
controlling a second type of said at least two different types of radiant heating sub-systems with a solid state electronic control panel which is pre-programmed to control said first of said at least two different types of radiant heating sub-systems according to a first control program, wherein said first and second types of said at least two different types of radiant heating sub-systems are different types of radiant heating sub-systems; said method further comprises the steps of:
measuring temperature within a particular zone;
sensing a demand for heat within said particular zone;
checking status of said pressure proving device;
activating said vacuum pump if and only if said pressure proving device is deactivated;
activating said plurality of burners in response to said activation of said pressure proving device caused by activation of said vacuum pump;
deactivating said plurality of burners after said measured temperature in said particular zone reaches a predetermined temperature; and,
deactivating said vacuum pump after a predetermined period of time has elapsed after said plurality of burners have been deactivated.

39. A method of controlling one or more types of radiant energy heating sub-systems in a radiant energy heating system as recited in claim 38 wherein a deactivation of said pressure proving device occurring while said burners are firing will result in immediate deactivation of said burners.

40. The method of controlling one or more types of radiant energy heating sub-system in a radiant energy heating system as recited in claim 38, further comprising the step of controlling one or more of said solid state electronic control panels with a personal computer programmed to interface and control said control panels.

41. A method of controlling a radiant energy heating system, wherein said radiant energy heating system includes at least two different types of radiant heating sub-systems, wherein said radiant energy heating system comprises a plurality of burners operatively arranged in series and a common vacuum pump driven by a variable frequency motor having a pressure proving device being active when a predetermined pressure is measured at a predetermined location within said system indicating it is safe to fire said burners, said system arranged to heat a particular zone in a facility, said method comprising:

controlling a first type of said at least two different types of radiant heating sub-systems with a solid state electronic control panel which is pre-programmed to control said first of said at least two different types of radiant heating sub-systems according to a first control program; and, controlling a second type of said at least two different types of radiant heating sub-systems with a solid state electronic control panel which is pre-programmed to control said first of said at least two different types of radiant heating sub-systems according to a first control program, wherein said first and second types of said at least two different types of radiant heating sub-systems are different types of radiant heating sub-systems; said method further comprising the steps of:

measuring temperature within said particular zone;

sensing a demand for heat within said particular zone;

checking status of said pressure proving device;

determining vacuum pump running speed based upon a formula which includes said measured external temperature;

activating said vacuum pump if and only if said pressure proving device is deactivated;

activating said plurality of burners in response to said activation of said pressure proving device caused by activation of said vacuum pump;

deactivating said plurality of burners after said measured temperature in said particular zone reaches a predetermined temperature; and, deactivating said vacuum pump after a predetermined period of time has elapsed after said plurality of burners have been deactivated.

42. A method of controlling one or more types of radiant energy heating sub-systems in a radiant energy heating system as recited in claim 41 wherein a deactivation of said pressure proving device occurring while said burners are firing will result in immediate deactivation of said burners.

43. The method of controlling one or more types of radiant energy heating sub-system in a radiant energy heating system as recited in claim 41, further comprising the step of controlling one or more of said solid state electronic control panels with a personal computer programmed to interface and control said control panels.

* * * * *